(12) United States Patent
Zhang

(10) Patent No.: US 10,473,020 B2
(45) Date of Patent: Nov. 12, 2019

(54) METHOD AND SYSTEM FOR EXHAUST AFTERTREATMENT

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 15/218,639

(22) Filed: Jul. 25, 2016

(65) Prior Publication Data
US 2018/0023450 A1  Jan. 25, 2018

(51) Int. Cl.
*F01N 13/00* (2010.01)
*F01N 9/00* (2006.01)
*F02B 37/18* (2006.01)
*F01N 3/10* (2006.01)
*F01N 3/20* (2006.01)
*F01N 3/021* (2006.01)
*F01N 3/023* (2006.01)

(52) U.S. Cl.
CPC ............ *F01N 13/009* (2014.06); *F01N 3/021* (2013.01); *F01N 3/023* (2013.01); *F01N 3/103* (2013.01); *F01N 3/2066* (2013.01); *F01N 9/00* (2013.01); *F02B 37/186* (2013.01); *F01N 2240/36* (2013.01); *F01N 2900/0412* (2013.01); *F01N 2900/08* (2013.01); *F01N 2900/1606* (2013.01); *F01N 2900/1614* (2013.01); *Y02A 50/2325* (2018.01); *Y02T 10/144* (2013.01); *Y02T 10/24* (2013.01); *Y02T 10/47* (2013.01)

(58) Field of Classification Search
CPC .......... F01N 3/009; F01N 3/021; F01N 3/023; F01N 3/103; F01N 3/2066; F01N 9/00; F01N 2240/36; F01N 2900/0412; F01N 2900/08; F01N 2900/1606; F01N 2900/1614; F02B 37/186
See application file for complete search history.

(56) References Cited

U.S. PATENT DOCUMENTS

| | | | |
|---|---|---|---|
| 4,244,187 A | 1/1981 | Lane et al. | |
| 4,848,083 A * | 7/1989 | Goerlich | F01N 3/025 60/303 |
| 5,910,097 A | 6/1999 | Boegner et al. | |
| 6,170,259 B1 * | 1/2001 | Boegner | B01D 53/9495 60/286 |
| 6,212,885 B1 * | 4/2001 | Hirota | B01D 53/9454 60/274 |
| 6,233,925 B1 * | 5/2001 | Hirota | F01N 3/0233 60/285 |
| 6,408,620 B2 * | 6/2002 | Boegner | B01D 53/9481 60/287 |
| 6,820,417 B2 * | 11/2004 | May | B01D 53/9477 60/297 |

(Continued)

*Primary Examiner* — Jason D Shanske
*Assistant Examiner* — Matthew T Largi
(74) *Attorney, Agent, or Firm* — Geoffrey Brumbaugh; McCoy Russell LLP

(57) ABSTRACT

Methods and systems are provided for reducing engine emissions using a branched exhaust system. In one example, a branched exhaust system may include a plurality of sub-branches each housing a distinct exhaust component, and an order of exhaust flow through each of the exhaust components may be adjusted based on engine operating conditions and temperature demand of the distinct components.

19 Claims, 12 Drawing Sheets

(56) References Cited

U.S. PATENT DOCUMENTS

| | | | |
|---|---|---|---|
| 7,171,801 B2* | 2/2007 | Verkiel | F01N 3/0231 60/286 |
| 7,343,736 B2* | 3/2008 | Kalish | F01N 3/0253 60/288 |
| 7,827,782 B2* | 11/2010 | Theis | F01N 3/0807 60/274 |
| 7,892,508 B2 | 2/2011 | Katoh | |
| 8,234,865 B2 | 8/2012 | Andrews | |
| 8,555,636 B2 | 10/2013 | Schwarzenthal et al. | |
| 2004/0020192 A1* | 2/2004 | Kimura | F01N 3/0233 60/286 |
| 2004/0083724 A1* | 5/2004 | Nakatani | F01N 3/0231 60/286 |
| 2005/0247049 A1* | 11/2005 | Kaboord | F01N 3/0807 60/286 |
| 2010/0146945 A1* | 6/2010 | Niimi | F01N 3/0253 60/287 |
| 2010/0251700 A1 | 10/2010 | Wan et al. | |

\* cited by examiner

FIG. 5

| Exhaust system mode | Operating condition | Order of exhaust flow |
|---|---|---|
| 1 | Cold start, DPF Regen | Flow exhaust first through DOC bypassing turbine, then flow through DPF, and finally through SCR |
| 2 | Cold start, NOx control | Flow exhaust first through DOC bypassing turbine, then flow through SCR, and finally through DPF |
| 3 | Hot start/Idle, DPF Regen | Flow exhaust first through DPF, then through SCR, turbine, and finally through DOC |
| 4 | Hot start/Idle, NOx control | Flow exhaust first through SCR, then through DPF, turbine, and finally through DOC |
| 5 | Middle load, DPF Regen | Flow exhaust first through DOC, then through turbine, DPF, and finally through SCR |
| 6 | Middle load, NOx control | Flow exhaust first through DOC, then through turbine, SCR, and finally through DPF |
| 7 | Acceleration/turbo lag, DPF Regen | Flow exhaust first through turbine, then through DOC, DPF, and finally through SCR |
| 8 | Acceleration/turbo lag, NOx control | Flow exhaust first through turbine, then through DOC, SCR, and finally through DPF |
| 9 | Peak load, DPF Regen | Flow exhaust simultaneously through turbine and DOC, then flow through DPF, and finally through SCR |
| 10 | Peak load, NOx control | Flow exhaust simultaneously through turbine and DOC, then flow through SCR, and finally through DPF |

METHOD AND SYSTEM FOR EXHAUST AFTERTREATMENT

FIELD

The present description relates generally to methods and systems for controlling a vehicle engine to increase efficiency of an exhaust aftertreatment system and reduce engine emissions.

BACKGROUND/SUMMARY

Engines may be operated with boosted aircharge provided via a turbocharger wherein an intake compressor is driven by an exhaust turbine. However, placing a turbine in an exhaust system can increase engine cold-start emissions due to the turbine acting as a heat sink. In particular, engine exhaust heat during the engine cold-start may be absorbed at the turbine, lowering the amount of exhaust heat that is received at a downstream exhaust after-treatment device. As such, this delays attainment of light-off temperature at an exhaust catalyst, such as a diesel oxidation catalyst (DOC) or a selective catalytic reduction (SCR) catalyst. In addition, regeneration of a particulate filter (such as a DPF) may be delayed. Placing the turbine downstream of the exhaust aftertreatment devices may result in turbo lag during vehicle acceleration.

Accordingly, various approaches have been developed for routing exhaust through different exhaust system components based on temperature requirements. One example approach, shown by Andrews in U.S. Pat. No. 8,234,865 involves routing exhaust towards an exhaust tailpipe via a passage that bypasses the exhaust turbine during cold-start conditions. A passive, thermatically-operated valve is used to regulate the flow of exhaust through the passage, the valve opening during low-temperature conditions (such as during the cold-start). By circumventing the turbine, exhaust heat may be directly delivered to the exhaust catalyst.

However, the inventors herein have recognized potential issues with such a system. As one example, the temperature of exhaust reaching each exhaust system component (including the turbine, the DOC, the DPF, and the SCR catalyst) cannot be regulated. Further, it may be difficult to provide an exhaust flow that meets the conflicting heat requirements of different exhaust components. For example, after catalyst light-off, the temperature of unobstructed exhaust reaching the DOC may be higher than desired. In particular, owing to a coating on the DOC surface, the catalyst may have higher conversion efficiencies at lower exhaust temperatures. As a result, the higher than desired temperature of exhaust reaching the catalyst may result in reduced catalyst functionality. Also, a lower than desired temperature of exhaust reaching the DPF during DPF regeneration may result in incomplete regeneration. Similarly, a lower than desired temperature of exhaust reaching the SCR catalyst during a purge event may reduce the efficiency of NOx conversion. Further, locating a DOC, DPF, and/or SCR catalyst upstream of the exhaust turbine may result in turbo lag and boost pressure loss during acceleration and higher engine load conditions.

The inventors herein have identified an approach by which the issues described above may be at least partly addressed. In one example, the issues described above may be addressed by a method for an engine comprising: adjusting a plurality of valves coupled to each of a first, second, third, and fourth sub-branch of a branched exhaust system, each sub-branch arranged parallel to a main exhaust passage and housing a distinct exhaust component; and varying an order of exhaust flow through the distinct exhaust components based on exhaust temperature constraint. In this way, exhaust heat may be delivered to each exhaust system component based on the engine operating conditions and the desired operating temperature of the respective component.

In one example, a turbocharged engine system may be configured with a branched exhaust assembly wherein the exhaust passage is divided into at least three separate branches, each creating a distinct flow path. The main exhaust passage may constitute the central (main) branch, while a first peripheral branch may be further divided into three sub-branches and a second peripheral branch may also be divided into three sub-branches. The sub-branches and branches may be interconnected to each other via valves such that an order of exhaust flow along each of the flow paths can be adjusted via adjustments to a position of the valves. Distinct exhaust components may be coupled to the distinct sub-branches of the branched exhaust assembly. For example, an exhaust turbine of the turbocharger may be coupled to a first sub-branch of the first peripheral branch, a diesel oxidation catalyst (DOC) may be coupled to a second sub-branch of the first peripheral branch, a diesel particulate filter (DPF) may be coupled to a third sub-branch of the second peripheral branch, and a selective catalytic reduction (SCR) device may be coupled to a fourth sub-branch of the second peripheral branch of the exhaust assembly. One or more urea injectors may be coupled to the fourth sub-branch upstream of the SCR catalyst for injection of a desired amount of urea during NOx purging. Based on engine operating conditions, valve positions of the branched exhaust assembly may be adjusted to operate the exhaust system in one of a plurality of modes with exhaust routed in a distinct flowpath providing desired heat to each component of the system.

As an example, during cold start conditions, valve positions may be adjusted so that exhaust may bypass the turbine and first flow through the DOC in order to expedite attainment of catalyst light-off temperature. Thereafter, based on DPF and SCR loading, the exhaust may either flow through the DPF and then through the SCR or vice versa. As another example, during vehicle acceleration, in order to reduce turbo lag, valve positions may be adjusted so that exhaust may be routed first through the turbine and then through the remaining exhaust components before being released to the atmosphere. An order of exhaust flow through the DOC, DPF, and SCR catalyst may be determined based on the relative heat requirement of each component. For example, exhaust flow may be directed first through the DPF when DPF regeneration conditions are met, enabling a larger portion of the exhaust heat to be transferred to the DPF, while exhaust flow may be directed first through the SCR catalyst when SCR regeneration conditions are met, enabling the larger portion of the exhaust heat to be transferred to the SCR catalyst. Further still, during high engine load conditions when boost is required, the valves may be adjusted such that exhaust may be simultaneously routed to the tailpipe through two separate flow paths. For example, a first portion of exhaust may flow first through the turbine, bypassing the DOC, and then through the DPF and SCR while a second (remaining) portion of the exhaust may flow first through the turbine, bypassing the DOC, and then through the DPF and SCR before exiting via the tailpipe. The portion of the exhaust routed through the DOC relative to the portion routed through the turbine may be adjusted based on the boost demand.

In this way, by routing exhaust through different flow paths of a branched exhaust assembly, it is possible to expedite attainment of catalyst light-off temperature while assisting DPF regeneration and/or SCR purge during cold-start conditions, and without compromising boosted engine performance. Specifically, exhaust can be flowed through various exhaust components with an order of exhaust flow through the components adjusted based on their individual heat requirements. By routing exhaust via multiple flow paths in the exhaust assembly, it is possible to partially bypass the turbine with reduced reliance on a dedicated waste gate. The technical effect of regulating an order of exhaust flow through the exhaust components housed in distinct sub-branches of a branched exhaust assembly is that exhaust heat can be directed to a specific component first, as required based on engine operating conditions, irrespective of the positioning order of the exhaust components relative to each other in the exhaust assembly. In addition, the heating requirement of different exhaust components may be met even if they are conflicting. Overall, by changing an order of exhaust flow through exhaust components, engine efficiency, emissions quality, and fuel efficiency may be improved in a boosted engine system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a table illustrating the different modes of operation of the branched exhaust assembly.

DETAILED DESCRIPTION

Figure 1:
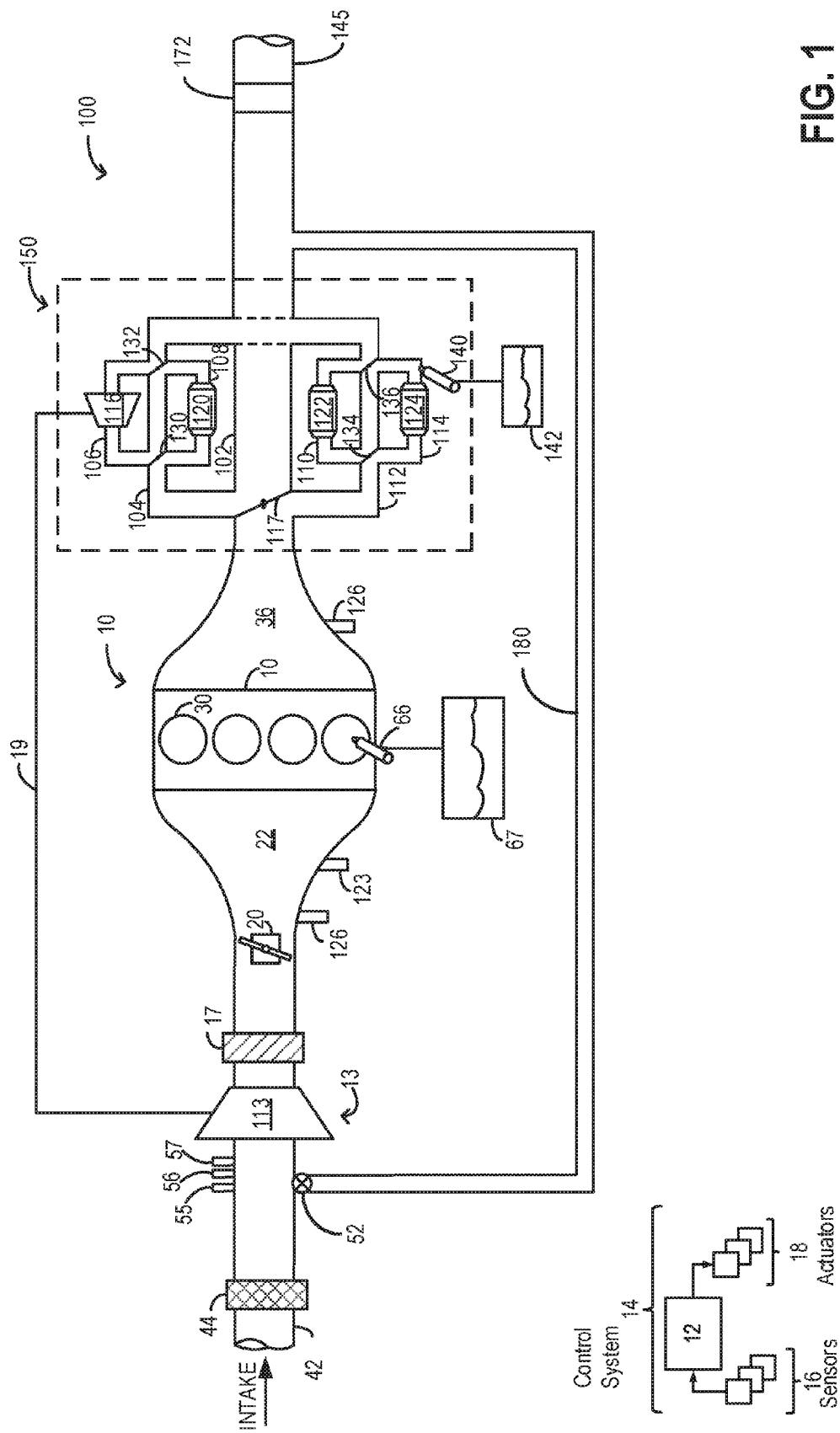
FIG. 1 shows an example embodiment of an engine system including a branched exhaust assembly.

The following description relates to systems and methods for operating a branched exhaust aftertreatment system to increase efficiency of exhaust system components and reduce engine emissions. An example engine system comprising a branched exhaust assembly is shown in FIG. 1. Distinct exhaust manifold components such as a turbine, a diesel oxidation catalyst (DOC), a diesel particulate filter (DPF), and a selective catalytic reduction (SCR) catalyst may be housed in distinct branches of the assembly. A cross-sectional view of the DPF with a view of alternating channels is shown in FIG. 7. The different modes of operation of the branched exhaust assembly are elaborated with reference to FIGS. 2A-2J. An engine controller may be configured to perform control routines, such as the example routines of FIGS. 3 and 4, to route exhaust through different branches of the branched exhaust assembly based on engine operating conditions and temperature requirements of the respective components. The different modes of operation of the branched exhaust assembly are tabulated in FIG. 5. An example operation of the branched exhaust assembly of FIG. 1 is shown with reference to FIGS. 6A-6B.

FIG. 1 schematically shows aspects of an example engine system 100 including an engine 10. In the depicted embodiment, engine 10 is a boosted engine coupled to a turbocharger 13 including a compressor 113 driven by a turbine 116. Specifically, fresh air is introduced along intake passage 42 into engine 10 via air cleaner 112 and flows to compressor 113. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 113 is coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. In the embodiment shown in FIG. 1, the pressure of the air charge within the intake manifold is sensed by manifold air pressure (MAP) sensor 123.

One or more sensors may be coupled to an inlet of compressor 113. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

Intake manifold 22 is coupled to a series of combustion chambers 30 through a series of intake valves (not shown). The combustion chambers are further coupled to exhaust manifold 36 via a series of exhaust valves (not shown). In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers from a fuel tank 67 via direct injection, port injection, throttle valve-body injection, or any combination thereof. In the combustion chambers, combustion may be initiated via spark ignition and/or compression ignition.

As shown in FIG. 1, the exhaust manifold 36 may lead to a branched exhaust assembly 150 wherein the main exhaust passage 102 is divided into three separate branches, each creating a distinct flow path. Exhaust may not flow directly from the main exhaust passage to the tailpipe 145 but may be routed through each of the two peripheral branches of the exhaust assembly 150 before reaching the tailpipe 145. The first peripheral branch 104 may be further divided into two sub-branches 106, and 108, while the second peripheral branch 112 may also be divided into two sub-branches 110, and 114. The branches may be fluidically connected to each other via a first four-way valve 117. The first and second sub-branches 106, and 108 may be fluidically connected to the first peripheral branch via a second four-way valve 130, and a third four-way valve 132. Similarly, the third and fourth sub-branches 110, and 114 may be fluidically connected to the second peripheral branch 112 via a fourth four-way valve 134, and a fifth four-way valve 136. By adjusting the position of each of the valves, an order of exhaust flow along each of the branches and sub-branches may be regulated. Distinct exhaust components may be coupled to each branch of the branched exhaust assembly 150. For example, the exhaust turbine 116 of the turbocharger 13 may be coupled to a first sub-branch 106, a diesel oxidation catalyst (DOC) 120 may be coupled to the second sub-branch 108, a diesel particulate filter (DPF) 122 may be coupled to a third sub-branch 110, and a selective catalytic reduction (SCR) catalyst 124 may be coupled to a fourth sub-branch of the exhaust assembly 150.

By adjusting a position of the first four-way valve 117, exhaust may be routed either through the first peripheral branch 104, or through the second peripheral branch 112. Based on engine operating conditions and a temperature requirement of each exhaust system component, each of the four-way valves 130, 132, 134, and 136 may be adjusted to route the exhaust in a distinct flow path passing through a plurality of the exhaust components in a specific order. Detailed description of the operation and structure of the branched exhaust assembly 150 and the distinct flow paths realized in the branched exhaust assembly will be discussed with relation to FIGS. 2A-2J.

In one example, responsive to vehicle acceleration, based on a higher temperature demand at the turbine, exhaust may be first routed through the turbine and then through each of the DOC, the DPF, and the SCR catalyst. In another example, responsive to an engine cold-start, based on a higher temperature demand at the DOC, exhaust may be first routed through the DOC and then through each of the DPF, and the SCR catalyst. In yet another example, responsive to DPF regeneration conditions being met, based on a higher temperature demand at the DPF, exhaust may be first routed through the DPF and then through each of the SCR catalyst, the turbine, and the DOC. In a further example, responsive to SCR purge conditions being met, a higher temperature demand is inferred at the SCR, and exhaust may be first routed through the SCR and then through each of the DPF, the DOC, and the turbine. In a yet further example, responsive to higher engine load conditions being met, exhaust may be simultaneously routed through the turbine and the DOC, and then through the DPF, and the SCR catalyst.

A urea injector port 140 may be coupled to the fourth sub-branch 114, downstream of the SCR catalyst 124. In an alternate embodiment, a second urea injector may be coupled to the fourth sub-branch 114 upstream of the SCR catalyst 124. Based on the direction of exhaust flow through the SCR catalyst 124, a reducing agent, such as urea, may be selectively injected from one of the two injectors. During a SCR catalyst purge event, a metered amount of urea may be supplied to the SCR from a urea tank 142 to selectively reduce NOx. Alternatively, any other reducing agent may be injected to the exhaust entering the SCR in order to facilitate NOx reduction, such as ammonia.

In another example embodiment, an exhaust after-treatment catalyst may be configured to oxidize residual hydrocarbons and/or carbon monoxide in the exhaust flow. Different exhaust after-treatment catalysts having any such functionality may be arranged in wash coats or bricks in the exhaust after-treatment stages, either separately or together.

Exhaust gas recirculation (EGR) passage 180 may be coupled to the exhaust passage 102 at a location downstream of branched exhaust assembly 150 for delivery of low-pressure EGR (LP-EGR) from downstream of the turbine 116 in the exhaust passage 102 to the intake manifold 22 upstream of the compressor 113. Depending on operating conditions such as engine temperature, a portion of the exhaust residuals may be diverted to the inlet of compressor 113 via exhaust gas recirculation (EGR) valve 52 and EGR passage 180. EGR valve 52 may be opened to admit a controlled amount of exhaust gas to the compressor inlet for desirable combustion and emissions control performance. EGR valve 52 may be configured as a continuously variable valve. In an alternate example, however, EGR valve 52 may be configured as an on/off valve.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the branched exhaust assembly 150, MAP sensor 123, exhaust temperature sensor, exhaust pressure sensor, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 81 may include, for example, throttle 20, EGR valve 52, four-way valves 117 and 115, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions such as engine temperature and engine load, the controller 12 may regulate the opening of each of the four-way valves 117, 130, 132, 134, and 136 to direct exhaust through the different flow paths of the branched exhaust assembly 150. Example control routines are described with regard to FIGS. 3 and 4. As another example, based on engine operating conditions, opening of EGR valve 52 may be adjusted to draw a desired amount of EGR from the exhaust passage 102 into the engine intake manifold.

Figure 2A:
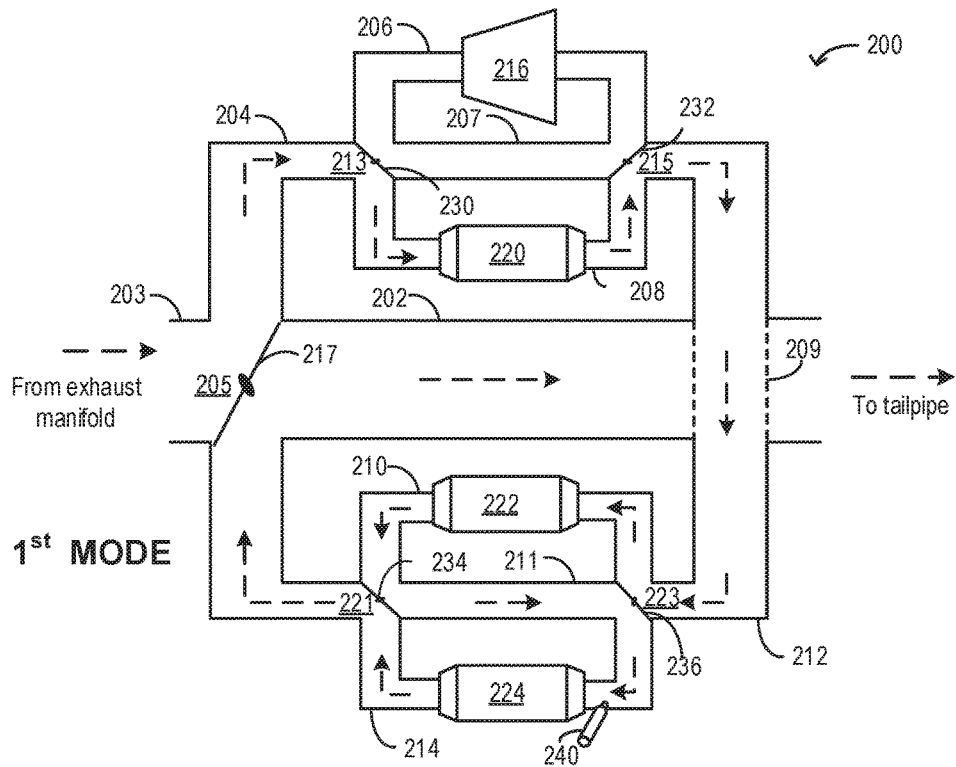
FIG. 2A shows an example embodiment of the branched exhaust assembly of FIG. 1 operating in a first mode.

FIG. 2A further elaborates the branched exhaust assembly introduced in FIG. 1 and shows an example embodiment 200 of operating the branched exhaust assembly in a first operating mode. In one example, assembly 200 is an embodiment of assembly 150 of FIG. 1 and therefore may share common features and/or configurations as those already described for branched exhaust assembly 150.

The branched exhaust assembly 200 is disposed on the main exhaust passage 203 downstream of the engine exhaust manifold and upstream of the tailpipe. At junction 205, the main exhaust passage 203 may divide into three separate branches, a first peripheral branch 204, a central branch 202, and a second peripheral branch 212, each creating a distinct flow path. The three branches 204, 202, and 212 may be substantially parallel to each other. A part of the main exhaust passage 203 may extend into the second branch 202. Exhaust may not flow directly from the main exhaust passage to the tailpipe 145 (via the second branch 202) but may be routed through each of the two peripheral branches of the exhaust assembly 150 before reaching the tailpipe 145. A first four-way valve 217 may be coupled to the main exhaust passage 203 at a first end (proximal to the exhaust manifold) of each of the three branches, specifically at the junction 205. The valve 217 may be actuated to one of two different positions in order to regulate the direction of exhaust flow through the three branches based on engine operating conditions. The valve 217 may fluidically connect the three branches and may be actuated based on signals received from the engine controller to vary an order of exhaust flow through each of the peripheral branches of the branched exhaust assembly 200.

The first peripheral branch 204 may be further subdivided into three sub-branches at a junction 213. The first peripheral branch 204 may lead to a first sub-branch 206, a first central sub-branch 207, and a second sub-branch 208. A second four-way valve 230 may be coupled to the first peripheral branch 204 at a first end (proximal to the exhaust manifold) of each of the three branches, specifically at the junction 213. A turbine 216 may be housed in the first sub-branch 206. A diesel oxidation catalyst (DOC) 220 may be housed in the second sub-branch 208. A part of the first peripheral branch 204 may constitute the first central sub-branch 207 which may not house any exhaust aftertreatment device. Downstream of each of the turbine 216, and the DOC 220, the first and second sub-branches may re-join at a junction 215 in the first peripheral branch 204. A third four-way valve 232 may be coupled to the first peripheral branch 204 at a second end (proximal to the tailpipe 145) of each of the three branches, specifically at the junction 215.

Similarly, the second peripheral branch 212 may be further subdivided into three sub-branches at a junction 221. The second peripheral branch 212 may lead to a third sub-branch 210, a second central sub-branch 211, and a fourth sub-branch 214. A fourth four-way valve 234 may be coupled to the second peripheral branch 212 at a first end (proximal to the exhaust manifold) of each of the three branches, specifically at the junction 221. A diesel particulate filter (DPF) 222 may be housed in the third sub-branch 210 and a selective catalytic reduction (SCR) catalyst 224 may be housed in the fourth sub-branch 214. A part of the second peripheral branch 212 may constitute the first central sub-branch 211 which may not house any exhaust aftertreatment device. Downstream of each of the DPF 222, and the SCR catalyst 224, the fourth and fifth sub-branches may re-join at a junction 223 in the second peripheral branch 212. A fifth four-way valve 236 may be coupled to the second peripheral branch 212 at a second end (proximal to the tailpipe) of each of the three branches, specifically at the junction 223.

A urea injector port 240 may be coupled to the fourth sub-branch 214, downstream of the SCR catalyst 224. In an alternate embodiment, a second urea injector may be coupled to the fourth sub-branch 214 upstream of the SCR catalyst 224. Based on the direction of exhaust flow through the SCR catalyst 224, a metered amount of urea, or an alternate reducing agent, may be selectively injected from one of the two injectors in order to selectively reduce NOx stored in the SCR catalyst 224.

Each of the five valves, 217, 230, 232, 234, and 236 fluidically connect the branches and the sub-branches of the branched exhaust assembly 200, and may be actuated in a coordinated manner to facilitate desired flow of exhaust through each of the exhaust system component. The junction 215 in the first peripheral branch 204, and junction 223 in the second peripheral branch 212 may be coupled via a passage 209. The passage 209 may not intersect the main exhaust passage 203 and exhaust may directly flow from the first peripheral branch 204 to the second peripheral branch 212 (and vice versa) through the passage 209.

Based on engine operating conditions and temperature requirement at each exhaust component (turbine, DOC, DPF, and SCR), the order of exhaust flow through each of the components may be adjusted. Based on the position of the five exhaust system valves 217, 230, 232, 234, and 236, exhaust may be routed from the main exhaust passage 203 through each of the sub-branches of the exhaust assembly 200 (in different orders). The exhaust assembly 200 may accordingly be operated in one of ten operational modes.

As such, the first operating mode represents a first setting of the exhaust system valves that enables exhaust flow control. In the first operating mode, the first four-way valve 217 may be in a first position, the second four-way valve 230 may be in a second position, the third four-way valve 232 may be in a first position, the fourth four-way valve 234 may be in a second position, and the fifth four-way valve 236 may be in a second position. When in the first operating mode, due to the first position of the first valve 217, the entire volume of exhaust flowing downstream via the main exhaust passage 203 may enter the first peripheral branch 204 at junction 205. Due to second position of the second valve 230, the entire volume of exhaust may then flow (from junction 213) through the DOC 220 housed in the second sub-branch 208, in a first direction (from a first end of DOC 220 proximal to the exhaust manifold to the second end of DOC 220 proximal to the tailpipe), bypassing the turbine 216. After exiting the DOC 220, the exhaust may continue to flow downstream via the second sub-branch 208 and enter the passage 209 from junction 215. Upon reaching the second peripheral branch 212, due to the second position of the fifth valve 236, the exhaust may enter (from junction 223) the third sub-branch 210 and flow through the DPF 222 in a second direction (from a second end of DPF 222 proximal to the tailpipe to the first end of DPF 222 proximal to the exhaust manifold), the second direction opposite to a first direction. Upon exiting the DPF 222, the exhaust may flow through the second central sub-branch 211 and enter the fourth sub-branch 214 at junction 223. The exhaust may then flow through the SCR catalyst 224 housed in the fourth sub-branch 214, in the second direction (from a second end of SCR catalyst 224 proximal to the tailpipe to the first end of SCR catalyst 224 proximal to the exhaust manifold). Upon exiting the SCR catalyst 224, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the first operating mode (as described above) during cold-start conditions when DPF regeneration may also be desired. This includes conditions when the engine temperature and/or ambient temperature is lower, and while a soot load on the DPF is higher. By adjusting exhaust flow to route hot exhaust first through the DOC 220, before flowing the exhaust through the remaining exhaust components (DPF 222 and SCR catalyst 224) during these conditions, a larger portion of the exhaust heat may be effectively transferred to the DOC 220, expediting catalyst activation. By bypassing the turbine 216 during cold start conditions, cooling of exhaust at the turbine 216 may be reduced and the heat may be utilized in providing desired heating to the DOC 220, and the DPF 222. Therefore, hot exhaust may be effectively used for increasing DOC 220 temperature and reducing the need for spark retard, thereby increasing fuel efficiency of the engine. By attaining the DOC 220 light-off temperature faster, emissions quality may be improved. By routing the exhaust exiting the DOC 220 directly to the DPF 222, passive regeneration of DPF 222 may be facilitated by the further increase in DPF 222 temperature caused by the flow of hot exhaust there-through. By using exhaust heat to opportunistically increase the DPF 222 temperature during regeneration, consumption of electrical energy for operating a dedicated DPF heater is reduced. While operating in the first mode, $NO_X$ present in the exhaust flow may be trapped at the SCR catalyst 224 as the exhaust flows through the catalyst on the way to the tailpipe.

Figure 2B:
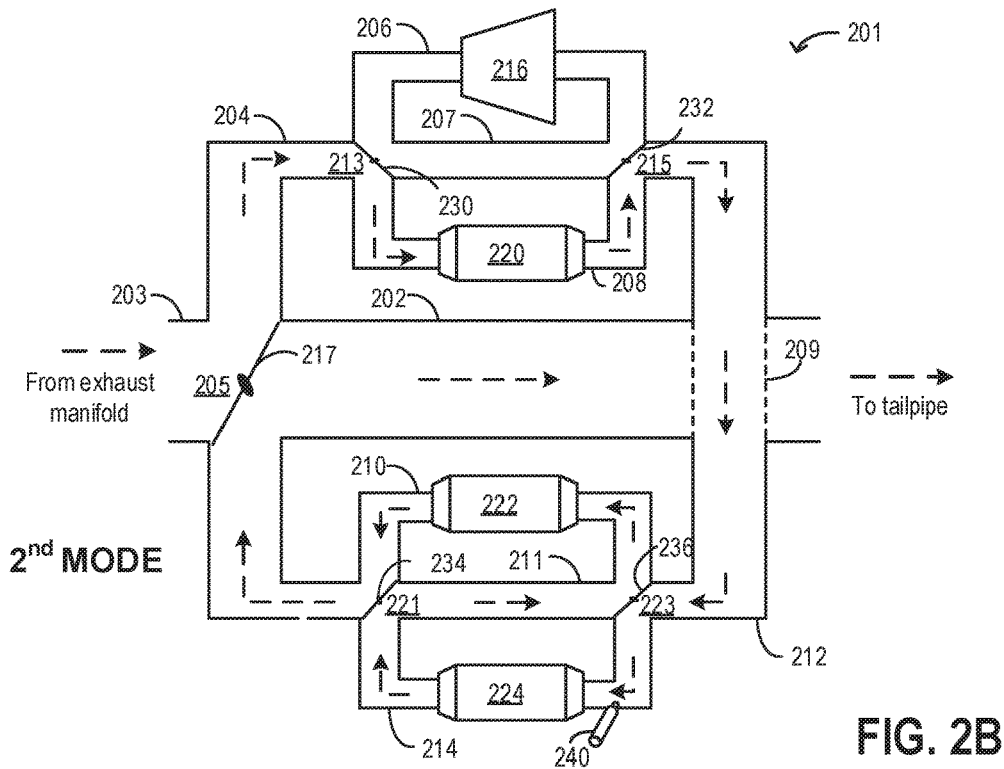
FIG. 2B shows an example embodiment of the branched exhaust assembly of FIG. 1 operating in a second mode.

FIG. 2B shows a schematic view 201 of an example embodiment of an exhaust bypass assembly 200 in a second operating mode. Components previously introduced in FIG. 2A are numbered similarly and not reintroduced.

As such, the second operating mode represents a second setting of the exhaust system valves that enables exhaust flow control. In the second operating mode, the first four-way valve 217 may be in a first position, the second four-way valve 230 may be in a second position, the third four-way valve 232 may be in a first position, the fourth four-way valve 234 may be in a first position, and the fifth four-way valve 236 may be in a first position. When in the second operating mode, due to first position of the first valve 217, the entire volume of exhaust flowing downstream via the main exhaust passage 203 may enter the first peripheral branch 204 at junction 205. Due to second position of the second valve 230, the entire volume of exhaust may then flow (from junction 213) through the DOC 220 housed in the second sub-branch 208, in a first direction (from a first end of DOC 220 proximal to the exhaust manifold to the second end of DOC 220 proximal to the tailpipe), bypassing the turbine 216. After exiting the DOC 220, the exhaust may continue to flow downstream via the second sub-branch 208 and enter the passage 209 from junction 215. Upon reaching the second peripheral branch 212, due to the second position of the fifth valve 236, the exhaust may enter (from junction 223) the fourth sub-branch 214 and flow through the SCR catalyst 224 in a second direction (from a second end of SCR catalyst 224 proximal to the tailpipe to the first end of SCR catalyst 224 proximal to the exhaust manifold), the second direction opposite to the first direction. Upon exiting the SCR catalyst 224, the exhaust may flow through the second central sub-branch 211 and enter the third sub-branch 210 (from junction 223). The exhaust may then flow through the DPF 222 housed in the third sub-branch 210, in the second direction (from a second end of DPF 222 proximal to the tailpipe to the first end of DPF 222 proximal to the exhaust manifold). Upon exiting the DPF 222, the exhaust may flow to the central branch 202 via the junction 205. Due to the position of the first four-way valve 217, the exhaust may continue to flow downstream through the central branch 202 to exit the branched exhaust assembly 200 and flow towards the tailpipe.

The branched exhaust assembly may be operated in the second operating mode (as described above) during cold-start conditions when NOx control at SCR catalyst may also be desired. By adjusting exhaust flow to route hot exhaust first through the DOC 220, before flowing the exhaust through the remaining exhaust components (DPF 222 and SCR catalyst 224), a larger portion of the exhaust heat may be effectively transferred to the catalyst, expediting attainment of catalyst light-off temperature. By routing the exhaust exiting the DOC 220 directly to the SCR catalyst 224, the NOx trapped at the catalyst may be effectively reduced by the hot exhaust flowing through the catalyst. During operation in this mode, urea (or any other reducing agent) may be injected into the fourth sub-branch 214 upstream of the SCR catalyst 224 via a urea injector 240. Due to injection of the reducing agent into the exhaust, the NOx accumulated in the SCR catalyst 224 may be effectively reduced. The water, and nitrogen produced following the NOx reduction reaction may be removed from the SCR catalyst 224 by the exhaust flow. By flowing the exhaust through the DPF 222, particulate matter such as soot may be deposited from the exhaust onto the cells inside the DPF 222. Also, the flow of exhaust through the DPF 222 in the second direction may facilitate in partly removing ash accumulated in the DPF 222 during the previous regeneration event. Further details of the ash removal process will be discussed in relation to FIG. 7.

Figure 2C:
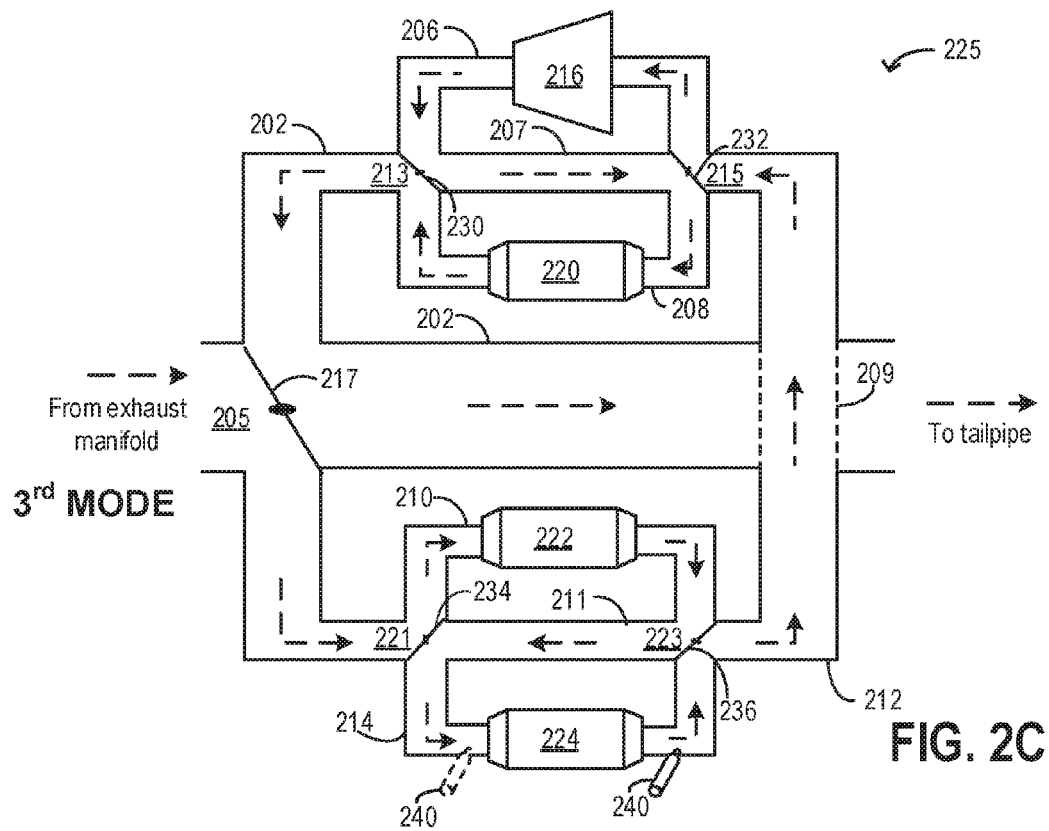
FIG. 2C shows an example embodiment of the branched exhaust assembly of FIG. 1 operating in a third mode.

FIG. 2C shows a schematic view 225 of an example embodiment of an exhaust bypass assembly 200 in a third operating mode. Components previously introduced in FIG. 2A are numbered similarly and not reintroduced.

The third operating mode represents a third setting of the exhaust system valves that enables exhaust flow control. In the third operating mode, the first four-way valve 217 may be in a second position, the second four-way valve 230 may be in a second position, the third four-way valve 232 may be in a second position, the fourth four-way valve 234 may be in a first position, and the fifth four-way valve 236 may be in a first position. When in the third operating mode, due to the second position of the first valve 217, the entire volume of exhaust flowing downstream via the main exhaust passage 203 may enter the second peripheral branch 212 at junction 205. Due to the first position of the fourth valve 234, the exhaust may enter (from junction 221) the third sub-branch 210 and flow through the DPF 222 in a first direction (from a first end of DPF 222 proximal to the exhaust manifold to the second end of DPF 222 proximal to the tailpipe). Upon exiting the DPF 222, the exhaust may flow through the second central sub-branch 211 and enter the fourth sub-branch 214 at junction 221. The exhaust may then flow through the SCR catalyst 224 housed in the fourth sub-branch 214, in a first direction (from a first end of SCR catalyst 224 proximal to the exhaust manifold to the first end of SCR catalyst 224 proximal to the tailpipe). After exiting the SCR catalyst 224, the exhaust may continue to flow downstream via the fourth sub-branch 214 and enter the passage 209 from junction 223. Upon reaching the first peripheral branch 202, due to the second position of the third valve 232, the exhaust may then enter (from junction 215) the first sub-branch 206. The exhaust may then flow through the turbine 216 in a second direction (from a second end of turbine 216 proximal to the tailpipe to the first end of turbine 216 proximal to the exhaust manifold). Upon exiting the first sub-branch 206, the exhaust may flow through the first central sub-branch 207 and enter the second sub-branch 208 at junction 215. The exhaust may then flow through the DOC 220 housed in the fourth sub-branch 214, in a second direction (from a second end of DOC 220 proximal to the tailpipe to the first end of DOC 220 proximal to the exhaust manifold). Upon exiting the DOC 220, the exhaust may flow to the central branch 202 via junction 205. Due to the second position of the first four-way valve 217, the exhaust may continue to flow downstream through the central branch 202 to exit the branched exhaust assembly 200 and flow towards the tailpipe.

The branched exhaust assembly may be operated in the third operating mode (as described above) once the DOC 220 is fully activated (after attainment of light-off temperature) and while DPF regeneration is desired. In one example, during this time, the engine may be idling and engine temperature may be higher. In another example, the branched exhaust assembly may be operated in this mode after a hot start, when the vehicle is started after a shorter period of inactivity and the catalyst temperature is higher than the light-off temperature. Therefore, in this mode, the demand for boost may be lower and heat from the exhaust may be first used for DPF 222 regeneration. By routing the exhaust first through the DPF 222, regeneration of DPF 222 may be facilitated by an increase in DPF 222 temperature caused by the flow of hot exhaust there through. Once the exhaust passes through the DPF 222, the SCR catalyst 224, and the turbine 216, the temperature of the exhaust may drop. Owing to a coating on the catalyst surface, the DOC 220 may have a higher conversion efficiency at lower exhaust temperatures. As a result, the low temperature exhaust reaching the DOC 220 (after passing through other aftertreatment devices) may result in an optimal performance of the DOC 220.

Figure 2D:
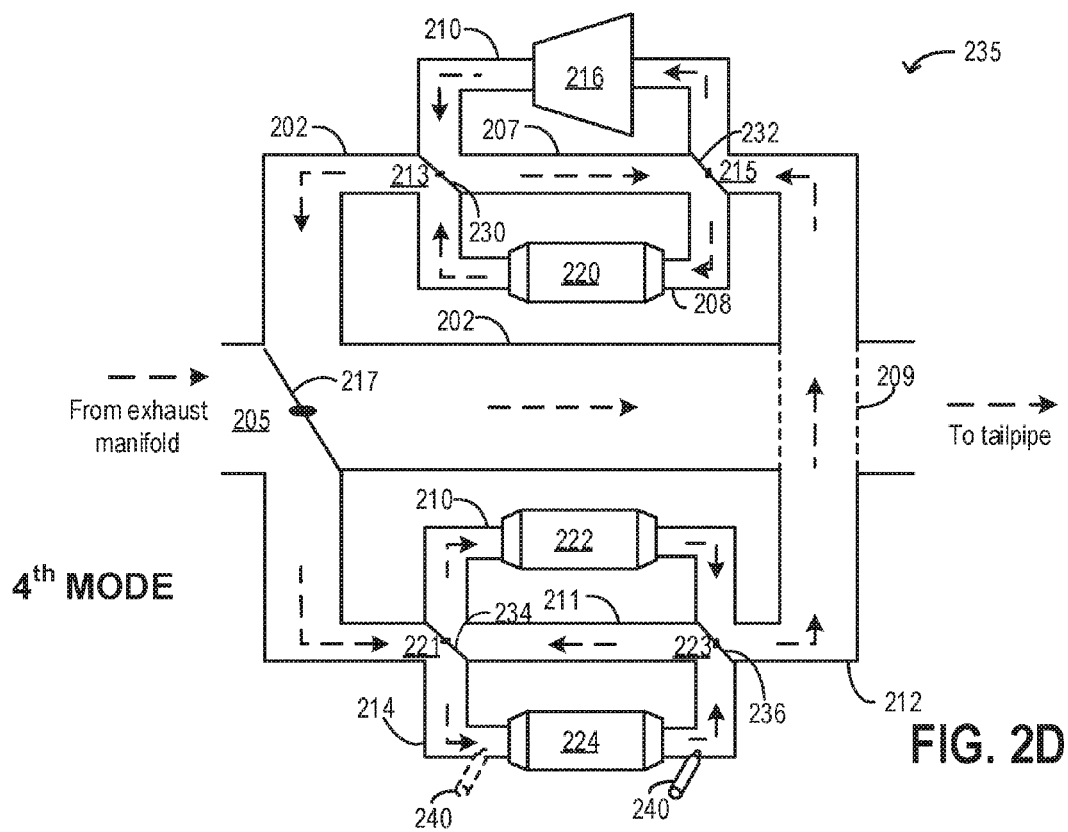
FIG. 2D shows an example embodiment of the branched exhaust assembly of FIG. 1 operating in a fourth mode.

FIG. 2D shows a schematic view 235 of an example embodiment of an exhaust bypass assembly 200 in a fourth operating mode. Components previously introduced in FIG. 2A are numbered similarly and not reintroduced.

The fourth operating mode represents a fourth setting of the exhaust system valves that enables exhaust flow control. In the fourth operating mode, the first four-way valve 217 may be in a second position, the second four-way valve 230 may be in a second position, the third four-way valve 232 may be in a second position, the fourth four-way valve 234 may be in a second position, and the fifth four-way valve 236 may be in a second position. When in the fourth operating mode, due to second position of the first valve 217, the entire volume of exhaust flowing downstream via the main exhaust passage 203 may enter the second peripheral branch 212 at junction 205. Due to the second position of the fourth valve 234, the exhaust may enter (from junction 221) the fourth sub-branch 214 and flow through the SCR catalyst 224 in a first direction (from a first end of SCR catalyst 224 proximal to the exhaust manifold to the second end of SCR catalyst 224 proximal to the tailpipe). Upon exiting the SCR catalyst 224, the exhaust may flow through the second central sub-branch 211 and enter the third sub-branch 210 at junction 221. The exhaust may then flow through the DPF 222 housed in the third sub-branch 210, in a first direction (from a first end of DPF 222 proximal to the exhaust manifold to the first end of DPF 222 proximal to the tailpipe). After exiting the DPF 222, the exhaust may continue to flow downstream via the third sub-branch 210 and enter the passage 209 from junction 223. Upon reaching the first peripheral branch 202, due to the second position of the third valve 232, the exhaust may then enter (from junction 215) the first sub-branch 206. The exhaust may then flow through the turbine 216 in a second direction (from a second end of turbine 216 proximal to the tailpipe to the first end of turbine 216 proximal to the exhaust manifold). Upon exiting the first sub-branch 206, the exhaust may flow through the first central sub-branch 207 and enter the second sub-branch 208 at junction 215. The exhaust may then flow through the DOC 220 housed in the fourth sub-branch 214, in a second direction (from a second end of DOC 220 proximal to the tailpipe to the first end of DOC 220 proximal to the exhaust manifold). Upon exiting the DOC 220, the exhaust may flow to the central branch 202 via junction 205. Due to the second position of the first four-way valve 217, the exhaust may continue to flow downstream through the central branch 202 to exit the branched exhaust assembly 200 and flow towards the tailpipe.

The branched exhaust assembly may be operated in the third operating mode (as described above) once the DOC 220 is fully activated (after attainment of light-off temperature) and DPF regeneration is desired. In one example, during this time, the engine load may be idling and engine temperature may be higher than the desired catalyst light-off temperature (catalyst fully functional). In another example, the branched exhaust assembly may be operated in this mode after a hot start, when the vehicle is started after a shorter period of inactivity and the catalyst temperature is higher than the light-off temperature. In this mode, the demand for boost may be lower and heat from the exhaust may be first used for NOx control at the SCR catalyst 224. By routing the exhaust first through the SCR catalyst 224, the NOx trapped at the catalyst may be effectively reduced by the hot exhaust flowing through the catalyst. During operation in this mode, urea (or any other reducing agent) may be injected into the fourth sub-branch 214 via a urea injector 240. The urea injector 240 coupled to the fourth sub-branch upstream of the SCR catalyst 224 (in the direction of exhaust flow in this mode) may be used for urea injection. The urea injector used for urea injection during operation in the second mode (as shown in FIG. 2B) may also-be used for urea injection in this fourth mode. Due to injection of the reducing agent into the exhaust, the NOx accumulated in the SCR catalyst 224 may be effectively reduced. The water, and nitrogen produced following the NOx reduction reaction may be removed from the SCR catalyst 224 by the exhaust flow. By flowing the exhaust through the DPF 222, particulate matter such as soot may be deposited from the exhaust onto the cells inside the DPF 222. Once the exhaust passes through the SCR catalyst 224, DPF 222, and the turbine 216, the temperature of the exhaust may drop. Owing to a coating on the catalyst surface, the DOC 220 may have a higher conversion efficiency at lower exhaust temperatures. As a result, the lower temperature exhaust reaching the DOC 220 may result in an optimal performance of the DOC 220.

In the fourth operating mode, the flow of exhaust through the DPF 222 is in a first direction (from a first end of DPF 222 proximal to the exhaust manifold to the first end of DPF 222 proximal to the tailpipe) while in the second operating mode, the flow of exhaust through the DPF 222 is in the second direction (from a second end of DPF 222 proximal to the tailpipe to the first end of DPF 222 proximal to the exhaust manifold). Therefore, while operating the branched exhaust assembly in different modes, exhaust may flow through the DPF in opposite directions. The flow of exhaust in opposite directions may facilitate in removing ash accumulated in the DPF from the burning of the particulate matter during regeneration events. Details of the ash removal process is discussed in relation to FIG. 7.

FIG. 7 shows a cross-sectional view of a diesel particulate filter (DPF) 700. In one example, DPF 700 may be DPF 122 of FIG. 1 and DPF 222 of FIGS. 2A-2J. The DPF 700 comprises an outer covering 706 enclosing a monolithic (honeycomb) structure within. The monolithic structure may consist of individual cells with alternate orientations such that the particulate matter may get trapped in first set of cells which act as inlet channels while the exhaust may concurrently pass uninhibited through a second set of cells which act as outlet channels. During regeneration of the DPF, ash may accumulate in both the inlet channels and the outlet channels of the DPF. For optimal functioning of the DPF, the accumulated ash needs to be removed opportunistically, otherwise the DPF may get saturated with ash loading. By changing the direction of exhaust flow, the inlet and outlet channels of the DPF may be intermittently reversed, facilitating cleaning of ash from the channels.

Arrow 708 shows a first direction of exhaust flow through the DPF, such as during the second operating mode of the branched exhaust assembly 210 in FIG. 2B. When exhaust flows in the first direction, particulate matter may collect in the inlet channel as shown by a first set of cells 702. Also, the flow of exhaust in the first direction may remove (flush out) the ash particles accumulated (during one or more prior regeneration events) in the outlet channel as shown by a second set of cells 704.

Arrow 710 shows a second direction of exhaust flow through the DPF, such as during the fourth operating mode of the branched exhaust assembly 235 in FIG. 2D. When exhaust flows in the second direction, the inlet and the outlet channels may get reversed, and particulate matter may collect in the second set of cells 704 while ash may be removed from the first set of cells 702. In this way, by reversing the direction of exhaust flow through the DPF, ash accumulated in each cell of the monolith structure may be opportunistically removed, thereby improving DPF efficiency.

Figure 2E:
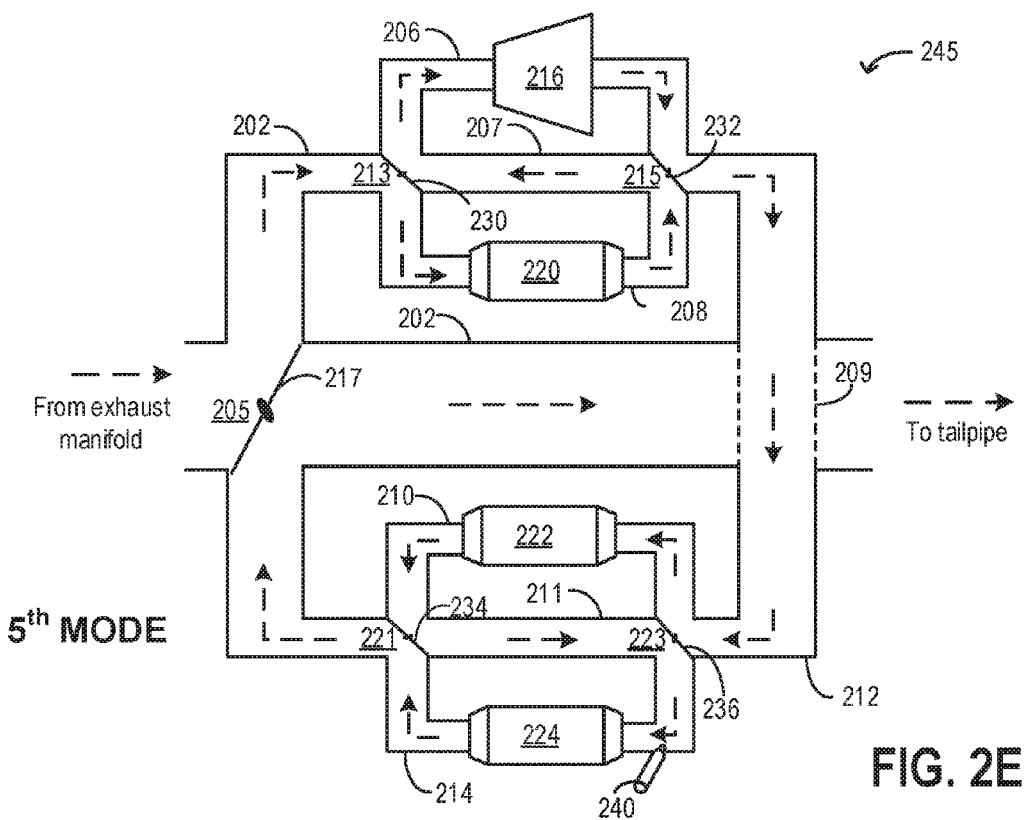
FIG. 2E shows an example embodiment of the branched exhaust assembly of FIG. 1 operating in a fifth mode.

Moving on to FIG. 2E, a schematic view 245 of an example embodiment of an exhaust bypass assembly 200 operating in a fifth operating mode, is shown. Components previously introduced in FIG. 2A are numbered similarly and not reintroduced.

The fifth operating mode represents a fifth setting of the exhaust system valves that enables exhaust flow control. In the fifth operating mode, the first four-way valve 217 may be in a first position, the second four-way valve 230 may be in a second position, the third four-way valve 232 may be in a second position, the fourth four-way valve 234 may be in a second position, and the fifth four-way valve 236 may be in a second position. When in the fifth operating mode, due to first position of the first valve 217, the entire volume of exhaust flowing downstream via the main exhaust passage 203 may enter the first peripheral branch 204 at junction 205. Due to second position of the second valve 230, the entire volume of exhaust may then flow (from junction 213) through the DOC 220 housed in the second sub-branch 208, in a first direction (from a first end of DOC 220 proximal to the exhaust manifold to the second end of DOC 220 proximal to the tailpipe). Upon exiting the DOC 220, the exhaust may flow through the first central sub-branch 207 and enter the first sub-branch 206 at junction 213. The exhaust may then pass through the turbine 216 housed in the first sub-branch 206 in a first direction (from a first end of turbine 216 proximal to the exhaust manifold to the second end of turbine 216 proximal to the tailpipe). Upon exiting the turbine 216, the exhaust may enter the passage 209 via the junction 215. Upon reaching the second peripheral branch 212, due to the second position of the fifth valve 236, the exhaust may enter (from junction 223) the third sub-branch 210 and flow through the DPF 222 in a second direction (from a second end of DPF 222 proximal to the tailpipe to the first end of DPF 222 proximal to the exhaust manifold). Upon exiting the DPF 222, the exhaust may flow through the second central sub-branch 211 and enter the fourth sub-branch 214 at junction 223. The exhaust may then flow through the SCR catalyst 224 housed in the fourth sub-branch 214, in a second direction (from a second end of SCR catalyst 224 proximal to the tailpipe to the first end of SCR catalyst 224 proximal to the exhaust manifold). Upon exiting the SCR catalyst 224, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the fifth operating mode (as described above) during mid-load engine operating conditions when DPF regeneration may also be desired. By adjusting exhaust flow to route hot exhaust first through the DOC 220, before flowing the exhaust through the remaining exhaust components, exhaust heat may be used to maintain the DOC 220 temperature. Due to the mid-load conditions, the demand for boost may be lower, and therefore the exhaust may be routed through the turbine 216 after passage through the DOC 220. By routing the exhaust to the DPF 222 before the SCR catalyst 224 during a DPF regeneration event, attainment of a higher temperature (at the DPF) may be achieved during the regeneration. While operating in the fifth mode, during flow of exhaust through the SCR catalyst 224, $NO_X$ may be trapped in the SCR catalyst 224.

Figure 2F:
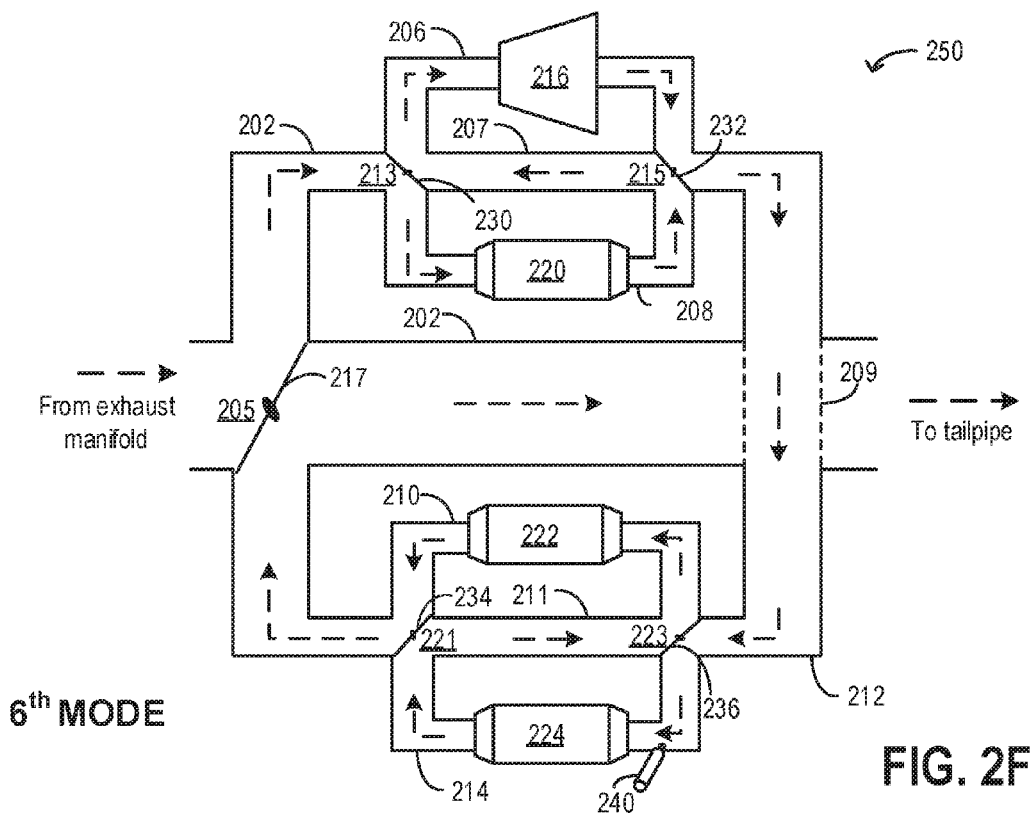
FIG. 2F shows an example embodiment of the branched exhaust assembly of FIG. 1 operating in a sixth mode.

FIG. 2F shows a schematic view 250 of an example embodiment of an exhaust bypass assembly 200 in a sixth operating mode. Components previously introduced in FIG. 2A are numbered similarly and not reintroduced.

The sixth operating mode represents a sixth setting of the exhaust system valves that enables exhaust flow control. In the sixth operating mode, the first four-way valve 217 may be in a first position, the second four-way valve 230 may be in a second position, the third four-way valve 232 may be in a second position, the fourth four-way valve 234 may be in a first position, and the fifth four-way valve 236 may be in a first position. When in the sixth operating mode, due to first position of the first valve 217, the entire volume of exhaust flowing downstream via the main exhaust passage 203 may enter the first peripheral branch 204 at junction 205. Due to the second position of the second valve 230, the entire volume of exhaust may then flow (from junction 213) through the DOC 220 housed in the second sub-branch 208, in a first direction (from a first end of DOC 220 proximal to the exhaust manifold to the second end of DOC 220 proximal to the tailpipe). Upon exiting the DOC 220, the exhaust may flow through the first central sub-branch 207 and enter the first sub-branch 206 at junction 213. The exhaust may then pass through the turbine 216 housed in the first sub-branch 206 in a first direction (from a first end of turbine 216 proximal to the exhaust manifold to the second end of turbine 216 proximal to the tailpipe). Upon exiting the turbine 216, the exhaust may enter the passage 209 via the junction 215. Upon reaching the second peripheral branch 212, due to the first position of the fifth valve 236, the exhaust may enter (from junction 223) the fourth sub-branch 214 and flow through the SCR catalyst 224 in a second direction (from a second end of SCR catalyst 224 proximal to the tailpipe to the first end of SCR catalyst 224 proximal to the exhaust manifold). Upon exiting the SCR catalyst 224, the exhaust may flow through the second central sub-branch 211 and enter the third sub-branch 210 at junction 223. The exhaust may then flow through the DPF 222 housed in the third sub-branch 210, in a second direction (from a second end of DPF 222 proximal to the tailpipe to the first end of DPF 222 proximal to the exhaust manifold). Upon exiting the DPF 222, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the sixth operating mode (as described above) during mid-load engine operating conditions when NOx control may also be desired at the DOC catalyst 224. Due to the mid-load condition, boost demand may be lower (based on lower driver demand) and hot exhaust flow may be first routed through the DOC 220 before being routed through the turbine 216 in order to maintain the DOC 220 temperature. By routing the exhaust exiting the turbine 216 directly to the SCR catalyst 224, the NOx trapped at the catalyst may be effectively reduced by the hot exhaust flowing through the catalyst. During operation in this mode, urea may be injected into the fourth sub-branch 214 upstream of the SCR catalyst 224 via a urea injector 240. Due to injection of the reducing agent into the exhaust, the NOx accumulated in the SCR catalyst 224 may be effectively reduced and the resultant water, and nitrogen may be removed from the SCR catalyst 224 by the exhaust flow. By flowing the exhaust through the DPF 222, particulate matter such as soot may be deposited from the exhaust onto the cells inside the DPF 222.

Figure 2G:
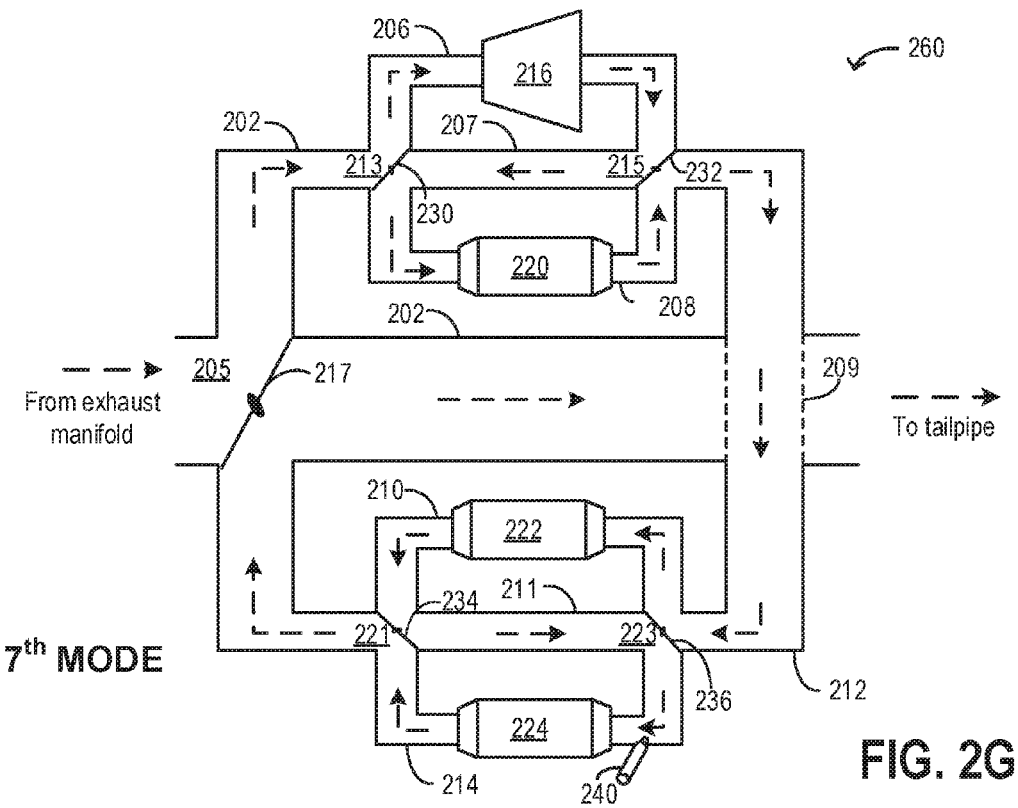
FIG. 2G shows an example embodiment of the branched exhaust assembly of FIG. 1 operating in a seventh mode.

FIG. 2G shows a schematic view 260 of an example embodiment of an exhaust bypass assembly 200 in a seventh operating mode. Components previously introduced in FIG. 2A are numbered similarly and not reintroduced.

The seventh operating mode represents a seventh setting of the exhaust system valves that enables exhaust flow control. In the seventh operating mode, the first four-way valve 217 may be in a first position, the second four-way valve 230 may be in a first position, the third four-way valve 232 may be in a first position, the fourth four-way valve 234 may be in a second position, and the fifth four-way valve 236 may be in a second position. When in the seventh operating mode, due to first position of the first valve 217, the entire volume of exhaust flowing downstream via the main exhaust passage 203 may enter the first peripheral branch 204 at junction 205. Due to first position of the second valve 230, the entire volume of exhaust may then flow (from junction 213) through the turbine 216 housed in the first sub-branch 206, in a first direction (from a first end of turbine 216 proximal to the exhaust manifold to the second end of turbine 216 proximal to the tailpipe). Upon exiting the turbine 216, the exhaust may flow through the second central sub-branch 207 and enter the second sub-branch 208 at junction 213. The exhaust may then pass through the DOC 220 housed in the second sub-branch 208 in a first direction (from a first end of DOC 220 proximal to the exhaust manifold to the second end of DOC 220 proximal to the tailpipe). Upon exiting the DOC 220, the exhaust may enter the passage 209 via the junction 215. Upon reaching the second peripheral branch 212, due to the second position of the fifth valve 236, the exhaust may enter (from junction 223) the third sub-branch 210 and flow through the DPF 222 in a second direction (from a second end of DPF 222 proximal to the tailpipe to the first end of DPF 222 proximal to the exhaust manifold). Upon exiting the DPF 222, the exhaust may flow through the second central sub-branch 211 and enter the fourth sub-branch 214 at junction 223. The exhaust may then flow through the SCR catalyst 224 housed in the fourth sub-branch 214, in a second direction (from a second end of SCR catalyst 224 proximal to the tailpipe to the first end of SCR catalyst 224 proximal to the exhaust manifold). Upon exiting the SCR catalyst 224, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the seventh operating mode (as described above) during vehicle acceleration events when DPF regeneration may also be desired. By adjusting exhaust flow to route hot exhaust first through the turbine 216, boost as desired for optimal engine operation during such acceleration events, may be increased. By flowing the hot exhaust exiting the turbine 216 through the DOC 220, exhaust heat may be used to maintain the DOC 220 temperature. By routing the exhaust to the DPF 222 before the SCR catalyst 224 during a DPF regeneration event, attainment of a higher temperature may be achieved during the regeneration. While operating in the seventh mode, during flow of exhaust through the SCR catalyst 224, $NO_X$ may be trapped in the SCR catalyst 224.

Figure 2H:
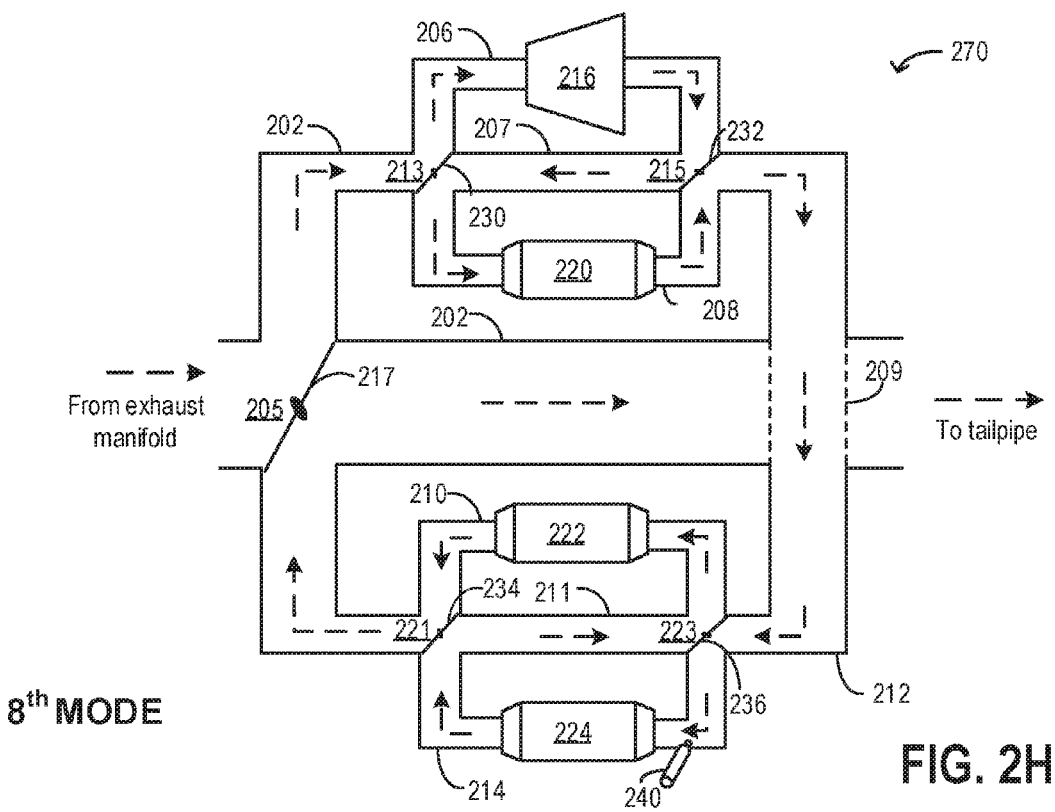
FIG. 2H shows an example embodiment of the branched exhaust assembly of FIG. 1 operating in an eighth mode.

FIG. 2H shows a schematic view 270 of an example embodiment of an exhaust bypass assembly 200 in a eighth operating mode. Components previously introduced in FIG. 2A are numbered similarly and not reintroduced.

The eighth operating mode represents an eighth setting of the exhaust system valves that enables exhaust flow control. In the eighth operating mode, the first four-way valve 217 may be in a first position, the second four-way valve 230 may be in a first position, the third four-way valve 232 may be in a first position, the fourth four-way valve 234 may be in a first position, and the fifth four-way valve 236 may be in a first position. When in the eighth operating mode, due to first position of the first valve 217, the entire volume of exhaust flowing downstream via the main exhaust passage 203 may enter the first peripheral branch 204 at junction 205. Due to first position of the second valve 230, the entire volume of exhaust may then flow (from junction 213) through the turbine 216 housed in the first sub-branch 206, in a first direction (from a first end of turbine 216 proximal to the exhaust manifold to the second end of turbine 216 proximal to the tailpipe). Upon exiting the turbine 216, the exhaust may flow through the second central sub-branch 207 and enter the second sub-branch 208 at junction 213. The exhaust may then pass through the DOC 220 housed in the second sub-branch 208 in a first direction (from a first end of DOC 220 proximal to the exhaust manifold to the second end of DOC 220 proximal to the tailpipe). Upon exiting the DOC 220, the exhaust may enter the passage 209 via the junction 215. Upon reaching the second peripheral branch 212, due to the first position of the fifth valve 236, the exhaust may enter (from junction 223) the fourth sub-branch 214 and flow through the SCR catalyst 224 in a second direction (from a second end of SCR catalyst 224 proximal to the tailpipe to the first end of SCR catalyst 224 proximal to the exhaust manifold). Upon exiting the SCR catalyst 224, the exhaust may flow through the second central sub-branch 211 and enter the third sub-branch 210 at junction 223. The exhaust may then flow through the DPF 222 housed in the third sub-branch 210, in a second direction (from a second end of DPF 222 proximal to the tailpipe to the first end of DPF 222 proximal to the exhaust manifold). Upon exiting the DPF 222, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the eighth operating mode (as described above) during vehicle acceleration events when NOx control at the SCR catalyst 224 may also be desired. By adjusting exhaust flow to route hot exhaust first through the turbine 216, a higher boost as desired by for optimal engine operation during such acceleration events, may be delivered. By flowing the hot exhaust exiting the turbine 216 through the DOC 220, catalyst temperature may be maintained at an optimal level. By routing the exhaust to the SCR catalyst 224 before the DPF 222, the NOx trapped at the catalyst may be effectively reduced by the hot exhaust flowing through the SCR catalyst 224. During operation in this mode, urea may be injected into the fourth sub-branch 214 upstream of the SCR catalyst 224 via a urea injector 240. Due to injection of the reducing agent into the exhaust, the NOx accumulated in the SCR catalyst 224 may be effectively reduced and the resultant water, and nitrogen may be removed from the SCR catalyst 224 by the exhaust flow. By flowing the exhaust through the DPF 222, particulate matter such as soot may be deposited from the exhaust onto the cells inside the DPF 222.

Figure 2I:
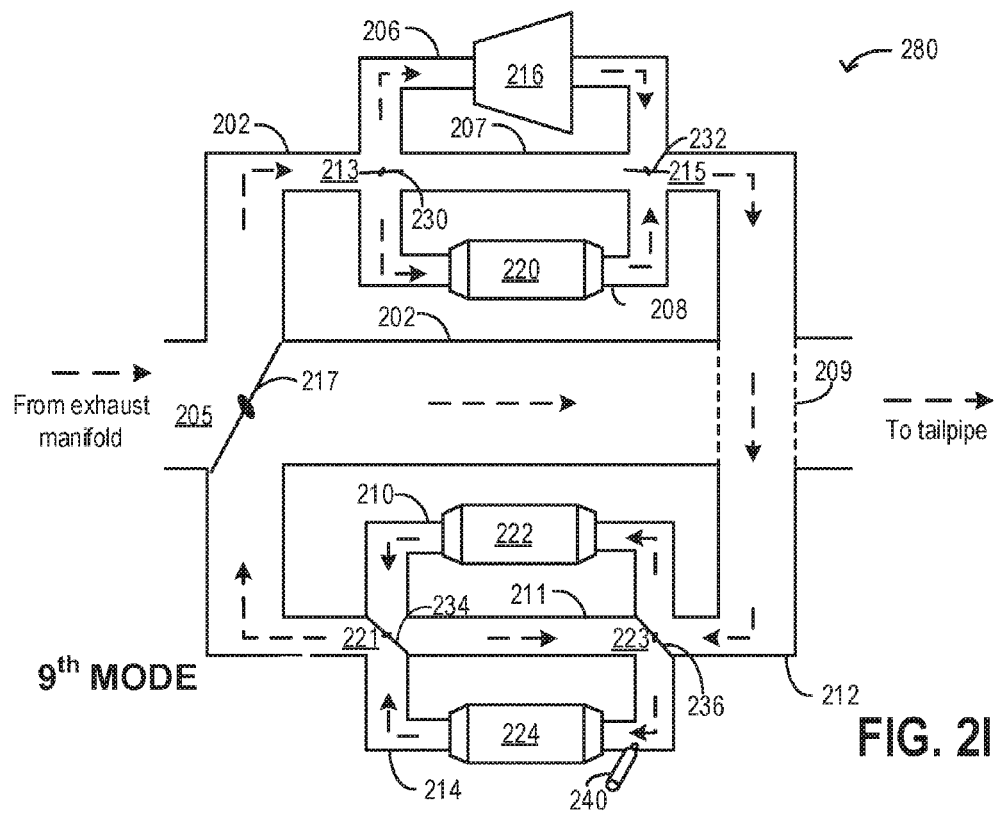
FIG. 2I shows an example embodiment of the branched exhaust assembly of FIG. 1 operating in a ninth mode.

FIG. 2I shows a schematic view 280 of an example embodiment of an exhaust bypass assembly 200 in a ninth operating mode. Components previously introduced in FIG. 2A are numbered similarly and not reintroduced.

The ninth operating mode represents a ninth setting of the exhaust system valves that enables exhaust flow control. In the ninth operating mode, the first four-way valve 217 may be in a first position, the second four-way valve 230 may be in a third position, the third four-way valve 232 may be in a third position, the fourth four-way valve 234 may be in a second position, and the fifth four-way valve 236 may be in a second position. When in the ninth operating mode, due to first position of the first valve 217, the entire volume of exhaust flowing downstream via the main exhaust passage 203 may enter the first peripheral branch 204 at junction 205. Due to third position of the second valve 230, a first portion of the exhaust may enter the first sub-branch 206 at junction 213 while a second (remaining) portion of the exhaust may concurrently enter the second sub-branch 208 at the junction 213. The ratio of exhaust entering the first sub-branch 206 and the second sub-branch 208 may be adjusted by adjusting the position of the second four-way valve 230. The first portion of the exhaust may flow through the turbine 216 (housed in the first sub-branch 206), bypassing the catalyst 220, while the second portion of the exhaust may simultaneously flow through the catalyst 220 (housed in the second sub-branch 208), bypassing the turbine 216. The first and the second portion of the exhaust may merge at the junction 215 and enter the passage 209.

Upon reaching the second peripheral branch 212 (via the passage 209), due to the second position of the valve 236, the entire volume of exhaust may enter (from junction 223) the third sub-branch 210 and flow through the DPF 222 in a second direction (from a second end of DPF 222 proximal to the tailpipe to the first end of DPF 222 proximal to the exhaust manifold). Upon exiting the DPF 222, the exhaust may flow through the second central sub-branch 211 and enter the fourth sub-branch 214 at junction 223. The exhaust may then flow through the SCR catalyst 224 housed in the fourth sub-branch 214, in a second direction (from a second end of SCR catalyst 224 proximal to the tailpipe to the first end of SCR catalyst 224 proximal to the exhaust manifold). Upon exiting the SCR catalyst 224, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the ninth operating mode (as described above) during conditions of peak (higher) engine load. Under such circumstances, by simultaneously flowing exhaust via two sub-branches of the exhaust assembly, a portion (second) of the exhaust may be released to the atmosphere bypassing the turbine while continuing to provide a desired boost to the engine utilizing a remaining portion (first) of the exhaust. The ratio of the first portion of the exhaust to the second portion may be based on driver demand and/or boost error. In one example, due to an increase in the driver demand, the first portion may be increased and the second portion may be correspondingly decreased. In another example, due to a decrease in driver demand, the first portion may be increased and the second portion may be correspondingly increased. In yet another example, during large boost error, the second portion may be increased such that a larger volume of exhaust may bypass the turbine thereby reducing boost error. Boost error is determined based on a difference between a desired boost and the actual boost. Therefore, during high load conditions, boosted performance may be maintained without the requirement of an additional wastegate valve and passage. The controller may determine the ratio based on a calculation using a look-up table with the input being one or more of driver demand and boost error. By flowing the combined (first and second portion) exhaust flow exiting the turbine 216 and the DOC 220 through the DPF 222 before the SCR catalyst 224 during a DPF regeneration event, attainment of a higher DPF temperature may be achieved during the regeneration. While operating in the ninth mode, during flow of exhaust through the SCR catalyst 224, $NO_X$ may be trapped in the SCR catalyst 224.

Figure 2J:
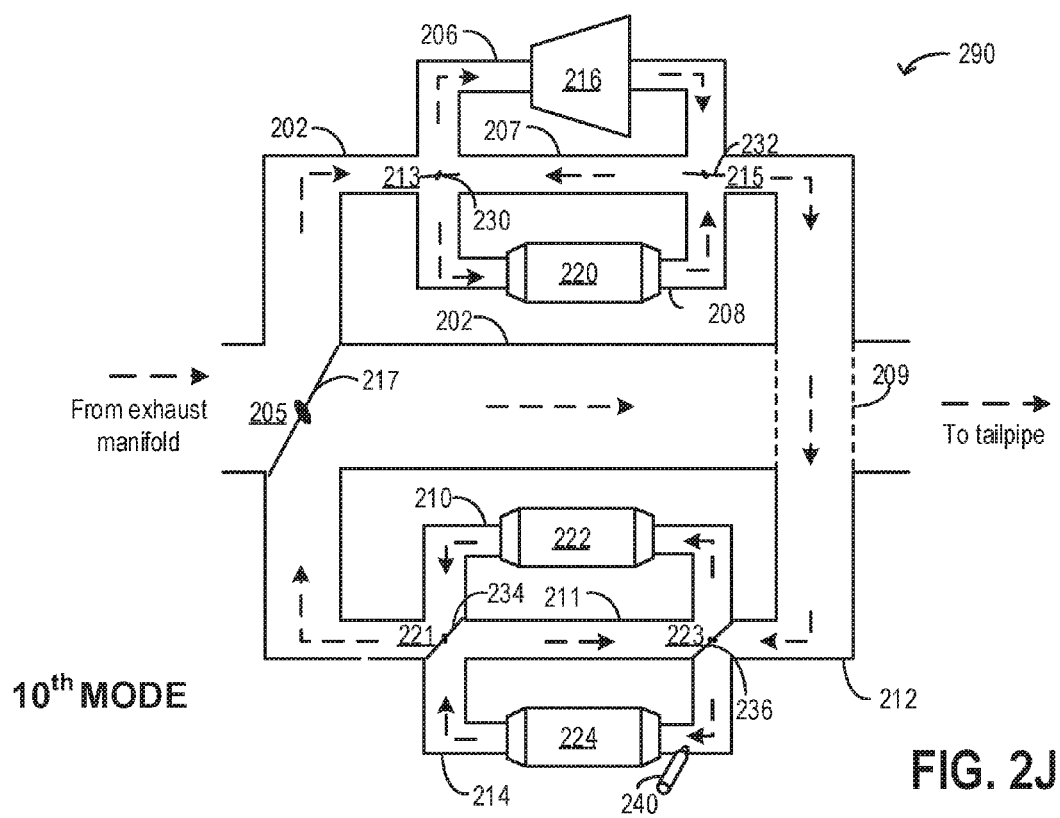
FIG. 2J shows an example embodiment of the branched exhaust assembly of FIG. 1 operating in a tenth mode.

FIG. 2J shows a schematic view 290 of an example embodiment of an exhaust bypass assembly 200 in a tenth operating mode. Components previously introduced in FIG. 2A are numbered similarly and not reintroduced.

The tenth operating mode represents a tenth setting of the exhaust system valves that enables exhaust flow control. In the tenth operating mode, the first four-way valve 217 may be in a first position, the second four-way valve 230 may be in a third position, the third four-way valve 232 may be in a third position, the fourth four-way valve 234 may be in a first position, and the fifth four-way valve 236 may be in a first position. When in the tenth operating mode, due to the first position of the first valve 217, the entire volume of exhaust flowing downstream via the main exhaust passage 203 may enter the first peripheral branch 204 at junction 205. Due to the second position of the second valve 230, a first portion of the exhaust may enter the first sub-branch 206 at junction 213 while a second (remaining) portion of the exhaust may enter the second sub-branch 208 at the junction 213. The ratio of exhaust entering the first sub-branch 206 and the second sub-branch 208 may be adjusted by adjusting the position of the second four-way valve 230. The first portion of the exhaust may flow through the turbine 216 (housed in the first sub-branch 206), bypassing the catalyst 220, while the second portion of the exhaust may simultaneously flow through the catalyst 220 (housed in the second sub-branch 208), bypassing the turbine 216. The first and the second portion of the exhaust may merge at the junction 215 and enter the passage 209.

Upon reaching the second peripheral branch 212 (via passage 209), due to the first position of the fifth valve 236, the exhaust may enter (from junction 223) the fourth sub-branch 214 and flow through the SCR catalyst 224 in a second direction (from a second end of SCR catalyst 224 proximal to the tailpipe to the first end of SCR catalyst 224 proximal to the exhaust manifold). Upon exiting the SCR catalyst 224, the exhaust may flow through the second central sub-branch 211 and enter the third sub-branch 210 at junction 223. The exhaust may then flow through the DPF 222 housed in the third sub-branch 210, in a second direction (from a second end of DPF 222 proximal to the tailpipe to the first end of DPF 222 proximal to the exhaust manifold). Upon exiting the DPF 222, the exhaust may flow to the central branch 202 via junction 205. Due to the first position of the first four-way valve 217, the exhaust may continue to flow downstream through the central branch 202 to exit the branched exhaust assembly 200 and flow towards the tailpipe.

The branched exhaust assembly may be operated in the tenth operating mode (as described above) during conditions of peak (higher) engine load. Under such circumstances, as described in relation to the ninth operating mode, by simultaneously flowing exhaust via two sub-branches of the exhaust assembly, a portion (second) of the exhaust may be released to the atmosphere bypassing the turbine while continuing to provide a desired boost to the engine utilizing a remaining portion (first) of the exhaust. The ratio of the first portion of the exhaust to the second portion may be based on driver demand and/or boost error. In one example, due to an increase in the driver demand, the first portion may be increased and the second portion may be correspondingly decreased. In another example, due to a decrease in driver demand, the first portion may be increased and the second portion may be correspondingly increased. In yet another example, during large boost error, the second portion may be increased such that a larger volume of exhaust may bypass the turbine thereby reducing boost error. The controller may use a look-up table to determine the ratio based on the one or more of driver demand and boost error as inputs. In this way, during higher load conditions, boosted performance may be maintained without the requirement of an additional wastegate valve and passage. By routing the exhaust to the SCR catalyst 224 before the DPF 222, the NOx trapped at the catalyst may be effectively reduced by the hot exhaust flowing through the SCR catalyst 224. During operation in this mode, urea may be injected into the fourth sub-branch 224 upstream of the SCR catalyst 224 via a urea injector 240. Due to injection of the reducing agent into the exhaust, the NOx accumulated in the SCR catalyst 224 may be effectively reduced and the resultant water, and nitrogen may be removed from the SCR catalyst 224 by the exhaust flow. By flowing the exhaust through the DPF 222, particulate matter such as soot may be deposited from the exhaust onto the cells inside the DPF 222.

In this way, based on engine operating conditions and temperature requirements of each exhaust after-treatment component, exhaust may be routed through all four components in the branched exhaust assembly 200 in an order that meets thermal requirements of the components without affecting engine performance.

In this way, the systems of FIGS. 1 and 2A-2J provide for an engine system comprising an intake manifold, an exhaust manifold, a branched exhaust assembly with a first peripheral branch comprising a first sub-branch, and a second sub-branch, and a second peripheral branch comprising a third sub-branch, and a fourth sub-branch, a first four-way valve coupled to the exhaust manifold upstream of each of the first peripheral branch, and the second peripheral branch, a second four-way valve coupled to a first end of the first peripheral branch, and a third four-way valve coupled to a second end of the first peripheral branch, a fourth four-way valve coupled to a first end of the second peripheral branch, and a fifth four-way valve coupled to a second end of the second peripheral branch, turbine coupled to the first sub-branch, a diesel oxidation catalyst (DOC) coupled to the second sub-branch, a diesel particulate filter (DPF) coupled to the third sub-branch, a selective catalytic reduction (SCR) catalyst coupled to the fourth sub-branch, and a controller with computer readable instructions stored on non-transitory memory for: inferring temperature demand of each of the turbine, the DOC, the DPF, and the SCR, based on one or more of desired boost, engine temperature, DPF soot loading, and SCR catalyst NOx loading, and when turbine temperature demand is higher than DOC, actuating each of the first valve, the second valve, and the third valve, to flow exhaust first through the turbine, when DPF temperature demand is higher than SCR catalyst, actuating each of the first valve, the fourth valve, and the fifth valve, to flow exhaust first through the DPF.

Figure 3:
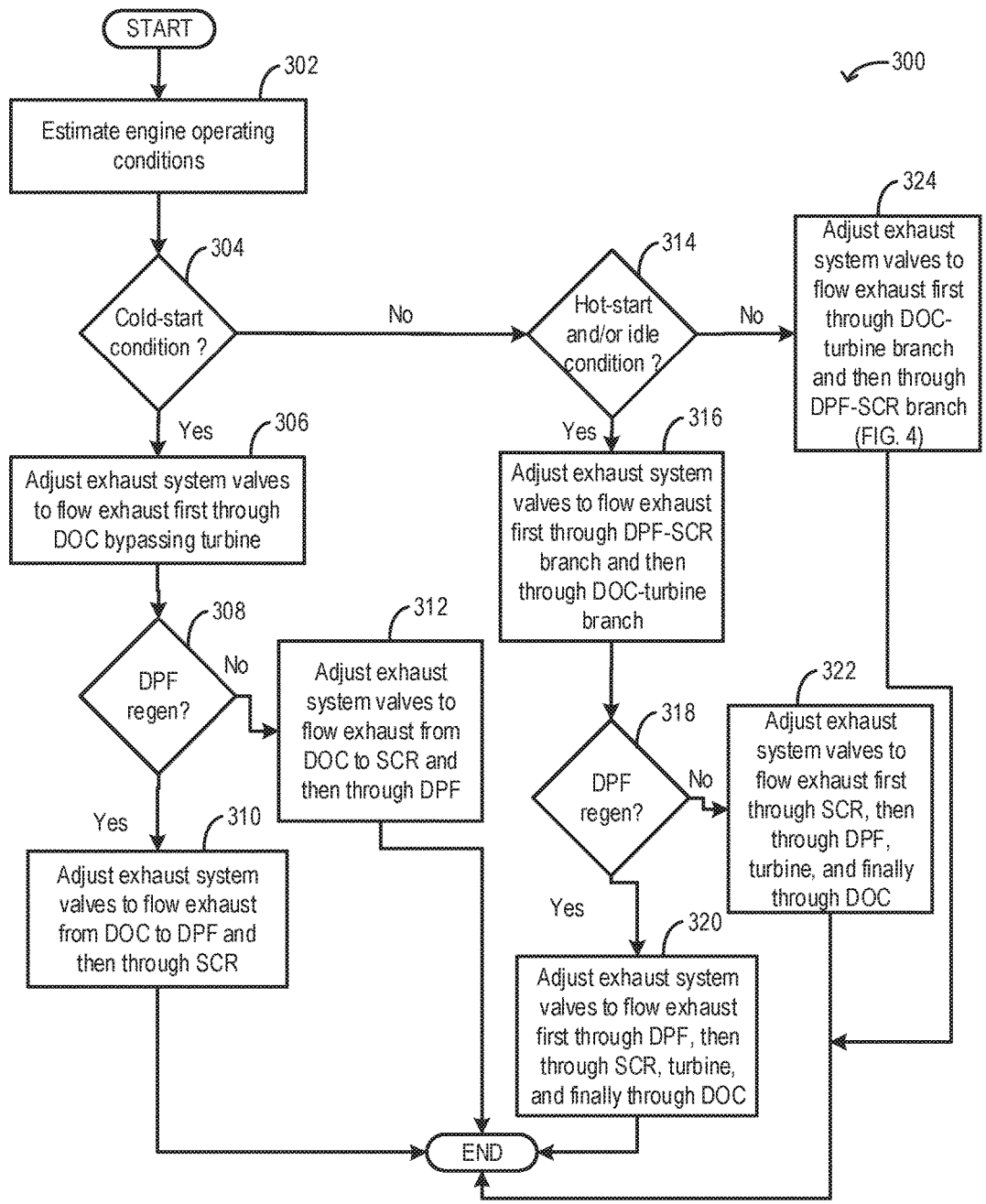
FIG. 3 shows a flow chart illustrating an example method that may be implemented for adjusting exhaust flow through the branched exhaust assembly during cold start, hot start, and idle engine operating conditions.

FIG. 3 illustrates an example method 300 that may be implemented for adjusting exhaust flow via different flow paths of a branched exhaust assembly, such as the assembly of FIGS. 1 and 2A-2J during engine operating conditions such as cold start, hot start, and idle. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine includes estimating and/or measuring current engine operating conditions. Conditions assessed may include, for example, engine temperature, engine load, engine speed, manifold vacuum, throttle position, exhaust pressure, exhaust air/fuel ratio, etc.

At 304, the routine includes determining if the vehicle engine is operating under cold-start conditions. An engine cold-start condition may be confirmed when the engine is started after a prolonged period of engine inactivity, when the engine temperature is lower than a threshold. The threshold may be based on a light-off temperature of a diesel oxidation catalyst (DOC) housed in a second sub-branch of the exhaust assembly (such as the exhaust assembly 200 in FIG. 2A). Prior to attainment of light-off temperature, the catalyst may not function efficiently, thereby increasing emissions during this time. Cold-start conditions may also be inferred from a lower than threshold ambient temperature.

During cold-start conditions, in order to expedite attainment of catalyst light-off temperature, hot exhaust may first be routed through the DOC instead of flowing it via the turbine (housed in a first sub-branch of the branched exhaust assembly) which may act as a heat sink, reducing temperature of catalyst reaching catalyst. Thus, if engine cold-start conditions are confirmed, the routine moves to 306 in order to adjust each of the exhaust system valves (such as valves 217, 230, 213, 221, and 223 as shown in FIGS. 2A-2J) to first flow the entire volume of exhaust through the DOC bypassing the turbine. This first setting of the exhaust system valves is discussed with relation to FIGS. 2A-2B. By adjusting exhaust flow to route hot exhaust first through the DOC, before flowing the exhaust through the remaining exhaust components, exhaust heat may be effectively transferred to the DOC, expediting catalyst activation. In this way, hot exhaust may be effectively used for increasing DOC temperature without the requirement of spark retard, thereby increasing fuel efficiency of the engine.

At 308, the routine includes determining if regeneration of the diesel particulate filter (DPF) coupled to a third sub-branch of the branched exhaust assembly is desired. Regeneration of the DPF may be desired when the particulate matter load accumulated on the DPF increases to a higher than threshold level. Particulate matter load accumulated on the DPF may be inferred based on inputs from one or more exhaust system pressure and temperature sensors. During the DPF regeneration event, a higher temperature may be desired at the DPF to facilitate burning of the particulate matter (such as soot) accumulated in the DPF. If it is determined that DPF regeneration is desired, at 310, the exhaust system valves may be adjusted to flow the entire volume of exhaust exiting the DOC first through the DPF and then through the selective catalytic reduction (SCR) catalyst housed in a fourth sub-branch of the branched exhaust assembly. The DPF and the SCR catalyst may be arranged on separate sub-branches of a second peripheral branch of the branched exhaust assembly. The position of each of the exhaust system valves when operating in this first mode, is described in relation to FIG. 2A. By flowing exhaust through the DPF, heat from the exhaust may be utilized for increasing the DPF temperature during a regeneration event. After exiting the DPF, when the exhaust flows through the SCR catalyst NOx present in the exhaust may be trapped in the SCR catalyst.

If at 308 it is determined that DPF regeneration is not desired, at 312, the exhaust system valves may be adjusted to flow the entire volume of exhaust exiting the DOC first through the SCR and then through the DPF. The position of each of the exhaust system valves when operating in this second mode, is described in relation to FIG. 2B. By flowing exhaust first through the SCR catalyst, temperature at the SCR catalyst may be increased which may facilitate NOx reduction at the SCR catalyst. A reducing agent such as urea may be injected to the exhaust flow entering the SCR catalyst to facilitate the reduction reaction. Water and nitrogen produced as a result of the reduction reaction may be released to the atmosphere via the exhaust tailpipe. After exiting the SCR, when the exhaust flows through the DPF particulate matter from the exhaust may be deposited at the inlet channels of the DPF. Also, due to the exhaust flow through the DPF, ash accumulated at the DPF due to a prior regeneration event, may be removed from the outlet channels. Due to the monolithic structure of the DPF (as discussed with relation to FIG. 7) exhaust flow in one direction may remove the ash from about half of the DPF cells while exhaust flow in the opposite direction (while operating the branched exhaust assembly in a different mode) may remove ash from the remaining half of the DPF cells.

If it is determined (at 304) that the engine is not operating under cold-start conditions, the routine moves on to step 314, where it is determined if the vehicle engine is operating under idle conditions and/or hot-start conditions. In one example, if the engine temperature is higher than a threshold temperature, and engine speed is lower than an idle speed it may be inferred that the engine is operating at a hot-start condition. In another example, if the engine load is lower than a threshold load, it may be inferred that the engine is idling. During hot-start conditions, and during engine idling condition, demand for boost may be lower. Post DOC light-off, owing to a coating on the DOC surface, the catalyst may have higher conversion efficiencies at lower exhaust temperatures. Therefore, during such conditions hot exhaust may not be required to be routed through the turbine and the DOC.

If it is determined that the vehicle is operating under the hot-start condition and/or the engine is idling, the exhaust system valves may be adjusted to first flow exhaust through the second peripheral branch housing the DPF and the SCR before flowing through the DOC, and turbine. Based on the temperature desired at the DPF, and the SCR, the order of exhaust flow through the third and the fourth sub-branch of the branched exhaust assembly may be determined.

Therefore, at 318, the routine includes determining if regeneration of the DPF is desired. During the DPF regeneration event, a higher temperature may be desired at the DPF to facilitate burning of the particulate matter (such as soot) accumulated in the DPF and completion of the regeneration process. If it is determined that DPF regeneration is desired, at 320, the exhaust system valves may be adjusted to flow the entire volume of exhaust first through the DPF and then through the SCR catalyst. The position of each of the exhaust system valves when operating in this third mode, is described in relation to FIG. 2C. By flowing exhaust through the DPF, heat from the exhaust may be utilized for increasing the DPF temperature during a regeneration event and facilitate the regeneration event. After exiting the DPF, the exhaust may flow through the SCR catalyst and NOx present in the exhaust may be trapped at the SCR catalyst. From the SCR catalyst the exhaust may flow to the first peripheral branch of the branched exhaust assembly, and flow through the turbine in order to provide a desired boost (which may be lower due to engine idling conditions). After exiting the turbine the exhaust may finally flow through the DOC before being released to the atmosphere. After passing through each of the DPF, the SCR catalyst, and the turbine the temperature of exhaust flowing through the DOC may be significantly lower which supports optimal functioning of the DOC. In this way, DPF regeneration may be accomplished while meeting boost demand and while improving DOC conversion ratio.

If at 318 it is determined that DPF regeneration is not desired, at 322, the exhaust system valves may be adjusted to flow the entire volume of exhaust first through the SCR and then through the DPF. The position of each of the exhaust system valves when operating in this fourth mode, is described in relation to FIG. 2D. By flowing exhaust first through the SCR catalyst, temperature at the SCR catalyst may be increased to support NOx reduction at the SCR catalyst. A reducing agent such as urea may be injected to the exhaust flow entering the SCR catalyst to facilitate in the reduction reaction. Water and nitrogen produced as a result of the reduction reaction may be released to the atmosphere via the tailpipe. After exiting the SCR when the exhaust flows through the DPF, particulate matter from the exhaust may be deposited at inlet channels of the DPF. Also, due to the exhaust flow through the DPF, ash deposited at the DPF due to a prior regeneration event, may be removed from the outlet channels. The direction of exhaust flow through the DPF in the fourth operating mode is opposite to the direction of exhaust flow through the DPF in the second operating mode. Therefore ash may be removed from each of the monolithic cells (both inlet and outlet channels) by exhaust flow in these two operating modes. In this way, SCR catalyst purge regeneration may be accomplished while meeting boost demand and while improving DOC conversion ratio.

If at 314 it is determined that the engine is not operating under hot-start and/or idle conditions, the exhaust system valves may be adjusted to first flow exhaust through the first peripheral branch housing the turbine and the DOC, and then flow exhaust through the second peripheral branch housing the DPF and the SCR catalyst. The order of exhaust flow through each of the turbine, the DOC, the DPF, and the SCR may be further determined based on engine operating conditions such as engine load and operator torque demand. As an example, the order of exhaust flow through each of the exhaust system components may be determined based on whether the engine is in a mid-load or peak-load region, whether the vehicle is accelerating, etc. The details of the exhaust flowpaths during each of the engine operating conditions is discussed in FIG. 4.

Figure 4:
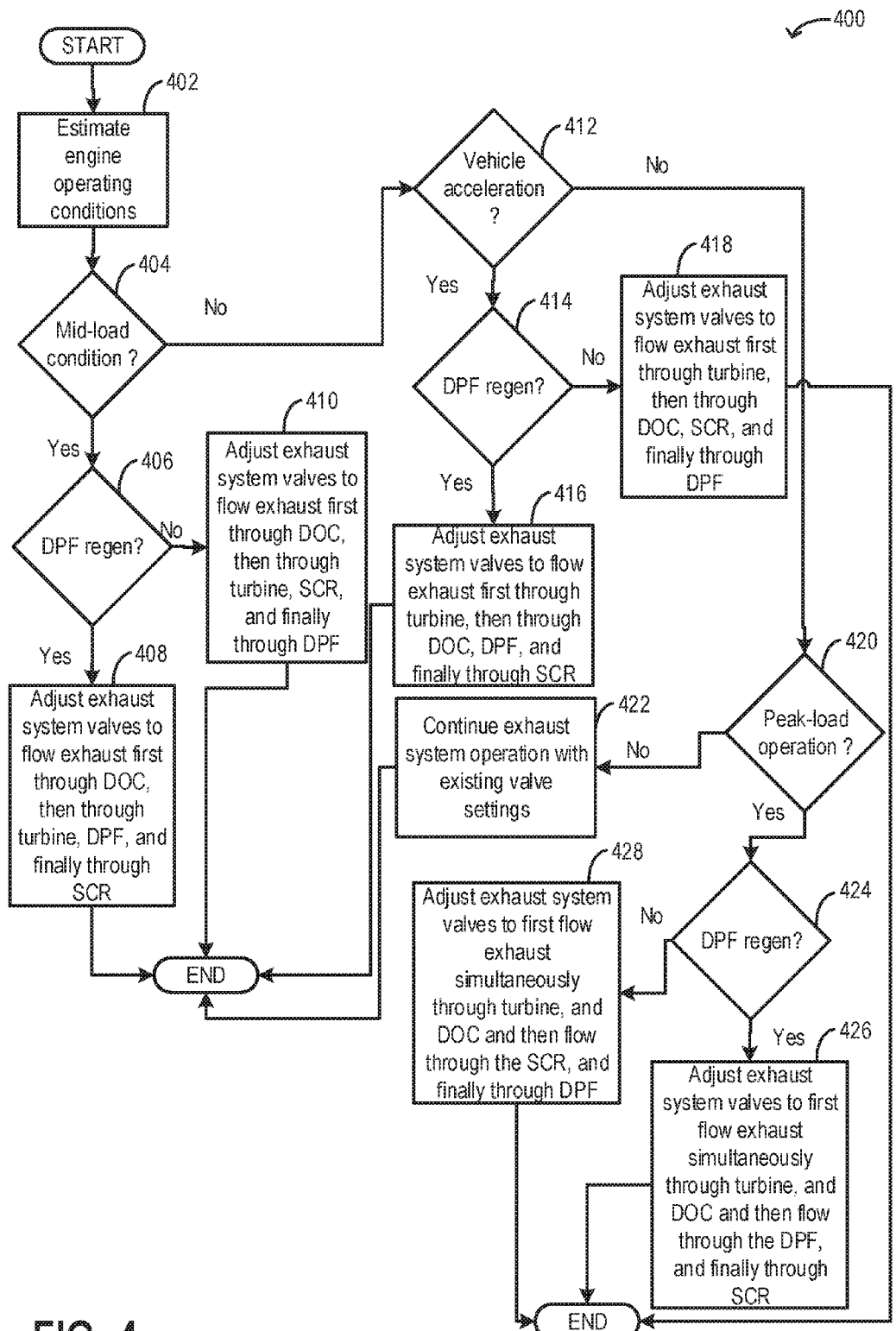
FIG. 4 shows a flow chart illustrating an example method that may be implemented for adjusting exhaust flow through the branched exhaust assembly during vehicle acceleration, mid-load, and high load engine operating conditions.

FIG. 4 illustrates an example method 400 that may be implemented for adjusting exhaust flow via different flow paths of a branched exhaust assembly, such as the assembly of FIGS. 1 and 2A-2J during vehicle acceleration, mid-load, and high load engine operating conditions.

At 402, the routine includes estimating and/or measuring current engine operating conditions. Conditions assessed may include, for example, engine temperature, engine load, engine speed, throttle position, exhaust pressure, exhaust air/fuel ratio, etc. At 404, the routine includes determining if the engine is operating at mid-load conditions. During such conditions, the demand for boost may be moderate, and for maintenance of emissions quality, the diesel oxidation catalyst (DOC) temperature may be maintained at a higher than threshold level. Based on the heat requirement of each exhaust after-treatment device, exhaust may be routed through different flow paths of the branched exhaust assembly.

If it is determined that the engine is operating at mid-load conditions, at 406, the routine includes determining if regeneration of a diesel particulate filter (DPF) coupled to a third sub-branch of the branched exhaust assembly is desired. Regeneration of the DPF may be desired when the particulate matter load accumulated on the DPF increases to a higher than threshold level. Particulate matter load accumulated on the DPF may be inferred based on inputs from one or more exhaust system pressure and temperature sensors. During the DPF regeneration event, a higher temperature may be desired at the DPF to facilitate burning of the particulate matter (such as soot) accumulated in the DPF and completion of the regeneration process.

If it is determined that DPF regeneration is desired, at 408, position of each of the exhaust system valves (such as valves 217, 230, 213, 221, and 223 as shown in FIGS. 2A-2J) may be adjusted to flow exhaust first through the DOC (housed in second sub-branch), then through the turbine (housed in first sub-branch), then through the DPF (housed in third sub-branch), and finally through the selective oxidation reduction (SCR) catalyst (housed in fourth sub-branch). The position of each of the exhaust system valves when operating in this fifth mode is described in relation to FIG. 2E. As the exhaust first flows through the DOC, heat from the exhaust may be used to maintain the DOC temperature. At the turbine, exhaust may be used to provide the desired boost based on driver demand. At the DPF, the hot exhaust may be utilized in increasing the DPF temperature for a regeneration event. Finally at the SCR catalyst, the NOx present in the exhaust may be adsorbed before the exhaust is released to the atmosphere.

If it is determined at 406 that DPF regeneration is not desired, at 410, a position of each of the exhaust system valves may be adjusted to flow exhaust first through the DOC, then through the turbine, then through the SCR catalyst, and finally through the DPF. The position of each of the exhaust system valves when operating in this sixth mode, is described in relation to FIG. 2F. At the DOC, heat from the exhaust may be used to maintain the DOC temperature while at the turbine, exhaust may be used to provide the desired boost. When flowing through the SCR, a reducing agent (such as urea) may be injected in the exhaust flow, and the heat from the exhaust may be utilized for NOx reduction at the SCR catalyst. The reducing agent may facilitate in NOx reduction and the resultant water and Nitrogen may be released to the atmosphere via the tailpipe. At the DPF, the particulate matter from the exhaust may be deposited at the inlet channels and the ash accumulated at the DPF due to a prior regeneration event, may be removed from the outlet channels.

If it is determined at 404 that the engine is not operating at a mid-load condition, at 412, the routine includes determining if the vehicle is accelerating. Due to increased driver demand for vehicle acceleration, there may be an increase in the desired boost level for optimal engine operation. Based on the heat requirement of each exhaust after-treatment device, exhaust may be routed through different flow paths of the branched exhaust assembly during vehicle acceleration.

If it is determined that the vehicle is accelerating, at 414, the routine includes determining if DPF regeneration is also desired. Regeneration of the DPF may be desired when the particulate matter load accumulated on the DPF increases to a higher than threshold level.

If it is determined that DPF regeneration is desired, at 416, a position of each of the exhaust system valves may be adjusted to flow exhaust first through the turbine, then through the DOC, then through the DPF, and finally through the SCR catalyst. The position of each of the exhaust system valves when operating in this seventh mode, is described in relation to FIG. 2G. As the exhaust first flows through the turbine, boost demand may be met for optimal engine performance during vehicle acceleration. The heat from the exhaust may then be used to maintain the DOC temperature. At the DPF, the hot exhaust may be utilized in raising the DPF temperature as desired during a regeneration event. Finally, at the SCR catalyst, the NOx present in the exhaust may be adsorbed before the exhaust is released to the atmosphere.

If it is determined at 414 that DPF regeneration is not desired, at 418, a position of each of the exhaust system valves may be adjusted to flow exhaust first through the turbine, then through the DOC, then through the SCR catalyst, and finally through the DPF. The position of each of the exhaust system valves when operating in this eighth mode, is described in relation to FIG. 2H. Heat from the exhaust may increase the turbine speed and deliver the desired boost during vehicle acceleration. At the DOC, heat from the exhaust may be used to maintain the DOC temperature. When flowing through the SCR, a reducing agent (such as urea) may be injected in the exhaust flow, and the heat from the exhaust may be utilized for NOx reduction at the SCR catalyst. The reducing agent may facilitate in reduction of NOx accumulated at the SCR catalyst. At the DPF, the particulate matter from the exhaust may be deposited at the inlet channels and the ash accumulated at the DPF due to a prior regeneration event may be removed from the outlet channels.

If at 412 it is determined that the vehicle is not accelerating, at 420, the routine includes determining if the engine is operating at a peak-load. During peak load conditions, the flow of exhaust may increase substantially and the entire volume of exhaust may not be routed through the turbine in order to reduce boost errors, and avoid damage to the turbocharger components.

If it is confirmed that the engine is operating at peak load conditions, at 424, the routine includes determining if regeneration of the DPF is also desired at this stage. If it is determined that DPF regeneration is desired, at 426, a position of each of the exhaust system valves may be adjusted to first flow exhaust simultaneously through the turbine, and the DOC and then through the DPF, and finally through the SCR. The position of each of the exhaust system valves when operating in this ninth mode is described in relation to FIG. 2I. By simultaneously flowing exhaust via the turbine and the DOC a portion (second) of the exhaust may be released to the atmosphere, bypassing the turbine while continuing to provide a desired boost to the engine utilizing a remaining portion (first) of the exhaust. The ratio of the first portion of the exhaust to the second portion may be based on driver demand and/or boost error. In one example, due to an increase in the driver demand, the first portion may be increased and the second portion may be correspondingly decreased. In another example, due to a decrease in driver demand, the first portion may be increased and the second portion may be correspondingly increased. In yet another example, during large boost error, the second portion may be increased such that a larger volume of exhaust may bypass the turbine thereby reducing boost error. Boost error is determined based on a difference between a desired boost and the actual boost. In this way, during high load conditions, boosted performance may be met with reduced reliance on a wastegate valve. In one example, the exhaust system may not require a wastegate valve or wastegate passage for boost control. By flowing the combined (first and second portion) exhaust flow exiting the turbine and the DOC through the DPF during a DPF regeneration event, attainment of a higher DPF temperature may be achieved during the regeneration. Finally during exhaust flow through the SCR catalyst, $NO_X$ may be trapped in the SCR catalyst.

If it is determined at 424 that DPF regeneration is not desired, at 426, a position of each of the exhaust system valves may be adjusted to flow exhaust to first flow exhaust simultaneously through the turbine and the DOC, and then through the SCR, and finally through the DPF. The position of each of the exhaust system valves when operating in this tenth mode is described in relation to FIG. 2J. The first portion of the exhaust flowing through the turbine may bypass the DOC, while the second portion of the exhaust simultaneously flowing through the DOC may bypass the turbine. The ratio of the first portion of the exhaust to the second portion may be based on driver demand and/or boost error. In one example, the second portion may be decreased while the first portion may be correspondingly increased as the driver demand increases. In another example, the second portion may be increased while the first portion may be correspondingly decreased as the boost error increases. When the combined exhaust flow from the turbine and the DOC reaches the SCR catalyst, a reducing agent (such as urea) may be injected in the exhaust flow, and the heat from the exhaust may be utilized for NOx reduction at the SCR catalyst. The reducing agent may facilitate in reduction of NOx accumulated at the SCR catalyst. At the DPF, the particulate matter from the exhaust may be deposited at the inlet channels and the ash accumulated at the DPF due to a prior regeneration event, may be removed from the outlet channels.

In a further embodiment, the order of exhaust flow through each of the exhaust components may be based on regeneration conditions of the DPF, and purge conditions of the SCR catalyst. In one example, during a first DPF regeneration condition when engine temperature is below a threshold, exhaust may flow first through the DOC, then through the DPF, and finally through the SCR catalyst, bypassing the turbine. In comparison, during a second DPF regeneration condition when the engine temperature is above the threshold, and engine load is in a mid-load region, exhaust may flow first through the DOC, then through the turbine, then through the DPF, and finally through the SCR catalyst. Further, during a third DPF regeneration condition when the vehicle is accelerating, exhaust may flow first through the turbine, then through the DOC, then through the DPF, and finally through the SCR catalyst. During a fourth DPF regeneration condition when the engine temperature is above the threshold, and engine load is higher than a threshold load, a first part of exhaust may flow first through the turbine, bypassing the DOC, and a second part of exhaust may flow first through the DOC, bypassing the turbine, then a combined first and second part may flow through the DPF, and finally through the SCR catalyst. During a fifth DPF regeneration condition when the engine temperature is above the threshold, and engine load is below an idle load threshold, exhaust may flow first through the DPF, then through the SCR catalyst, then through the turbine, and finally through the DOC.

In another example, during a first SCR catalyst purge condition when engine temperature is below a threshold, exhaust may flow first through the DOC, then through the SCR catalyst, and finally through the DPF, bypassing the turbine. In comparison, during a second DPF regeneration condition when the engine temperature is above the threshold, and engine load is in a mid-load region, exhaust may flow first through the DOC, then through the turbine, then through the SCR catalyst, and finally through the DPF. During a third SCR catalyst purge condition when the vehicle is accelerating, exhaust may flow first through the turbine, then through the DOC, then through the SCR catalyst, and finally through the DPF. During a fourth SCR catalyst purge condition when the engine temperature is above the threshold, and engine load is higher than a threshold load, a first part of exhaust may flow first through the turbine, bypassing the DOC, and a second part of exhaust may flow first through the DOC, bypassing the turbine, then a combined first and second part may flow through the SCR catalyst, and finally through the DPF. Further, during a fifth SCR catalyst purge condition when the engine temperature is above the threshold, and engine load is below an idle load threshold, exhaust may flow first through the SCR catalyst, then through the DPF, then through the turbine, and finally through the DOC.

During each of the first, second, third, and fourth SCR purge conditions, exhaust may flow through the DPF in a first direction (from a first end of DPF proximal to the exhaust manifold to the second end of DPF proximal to the tailpipe), and during the fifth SCR purge condition, exhaust may flow through the DPF in a second direction (from a second end of DPF proximal to the tailpipe to the second end of DPF proximal to the exhaust manifold), the first direction opposite to the second direction. During exhaust flow through DPF in the first direction, ash may be removed from a first set of cells of the DPF, and during exhaust flow through DPF in second direction, ash may be removed from a second remaining set of cells of the DPF. Also, during each of the first, second, this, fourth and fifth SCR purge conditions, a reducing agent such as urea may be injected upstream of the SCR catalyst via an injector coupled to the fourth sub-branch.

In this way, depending on the temperature requirement of each exhaust component (turbine, DOC, DPF, and SCR catalyst), exhaust flow path may be adjusted, and the exhaust bypass assembly may be operated in a plurality of modes, thereby optimizing engine performance.

FIG. 5 is a table 500 showing example modes of operation of the branched exhaust assembly of FIG. 1. An engine exhaust system may comprise a main exhaust passage, a branched exhaust assembly with a first peripheral branch and a second peripheral branch branching from the main exhaust passage, a first sub-branch, a second sub-branch, and a fifth central sub-branch branching from the first peripheral branch, a third sub-branch, a fourth sub-branch, and a sixth central sub-branch branching from the second peripheral branch. The first sub-branch may house a turbine, the second sub-branch may house a diesel oxidation catalyst (DOC), the third sub-branch may house a diesel particulate filter (DPF), and the fourth branch may house a selective catalytic reduction (SCR) catalyst. A first four-way valve may be coupled to the main passage upstream of each of the first and the second peripheral branch, a second four-way valve may be coupled to the first peripheral branch upstream of each of the first sub-branch, the second sub-branch, and the fifth central sub-branch, a third four-way valve may be coupled to the first peripheral branch downstream of each of the first sub-branch, the second sub-branch, and the fifth central sub-branch, a fourth four-way valve may be coupled to the second peripheral branch upstream of each of the third sub-branch, the fourth sub-branch, and the sixth central sub-branch, and a fifth four-way valve may be coupled to the first peripheral branch downstream of each of the third sub-branch, the fourth sub-branch, and the sixth central sub-branch. Based on temperature-based priority of exhaust components housed on each sub-branch, positions of each of five four-way valves coupled to the branched exhaust assembly may be varied to select an operating mode of the branched exhaust assembly.

The branched exhaust assembly may be operated in a first mode with a first valve setting to flow exhaust first through the DOC, then through the DPF, and finally through the SCR catalyst. In the first valve setting, the first four-way may be shifted to a first position, the second four-way valve may be shifted to a second position, the third four-way valve may be shifted to a first position, the fourth four-way valve may be shifted to a second position, and the fifth four-way valve may be shifted to a second position. The first mode may be selected responsive to each of a lower than threshold engine temperature (such as during cold-start), and a higher than threshold DPF soot load.

The branched exhaust assembly may be operated in a second mode with a second valve setting to flow exhaust first through the DOC, then through the SCR catalyst, and finally through the DPF. In the second valve setting, the first four-way may be shifted to the first position, the second four-way valve may be shifted to the second position, the third four-way valve may be shifted to the first position, the fourth four-way valve may be shifted to the first position, and the fifth four-way valve may be shifted to the first position. The second mode may be selected responsive to each of a lower than threshold engine temperature (such as during cold-start), and a higher than threshold SCR catalyst NOx load.

The branched exhaust assembly may be operated in a third mode with a third valve setting to flow exhaust first through the DPF, then through the SCR catalyst, then through the turbine and finally through the DOC. In the third valve setting, the first four-way may be shifted to the second position, the second four-way valve may be shifted to the second position, the third four-way valve may be shifted to the second position, the fourth four-way valve may be shifted to the first position, and the fifth four-way valve may be shifted to the first position. The third mode may be selected responsive to each of an engine idling condition (or an engine hot start), and a higher than threshold DPF soot load.

The branched exhaust assembly may be operated in a fourth mode with a fourth valve setting to flow exhaust first through the SCR catalyst, then through the DPF, then through the turbine and finally through the DOC. In the fourth valve setting, the first four-way may be shifted to the second position, the second four-way valve may be shifted to the second position, the third four-way valve may be shifted to the second position, the fourth four-way valve may be shifted to the second position, and the fifth four-way valve may be shifted to the second position. The fourth mode may be selected responsive to each of an engine idling condition (or hot start), and a higher than threshold SCR catalyst NOx load.

The branched exhaust assembly may be operated in a fifth mode with a fifth valve setting to flow exhaust first through the DOC, then through the turbine, then through the DPF and finally through the SCR catalyst. In the fifth valve setting, the first four-way may be shifted to the first position, the second four-way valve may be shifted to the second position, the third four-way valve may be shifted to the second position, the fourth four-way valve may be shifted to the second position, and the fifth four-way valve may be shifted to the second position. The fifth mode may be selected responsive to each of a mid-load engine condition, and a higher than threshold DPF soot load.

The branched exhaust assembly may be operated in a sixth mode with a sixth valve setting to flow exhaust first through the DOC, then through the turbine, then through the SCR catalyst and finally through the DPF. In the sixth valve setting, the first four-way may be shifted to the first position, the second four-way valve may be shifted to the second position, the third four-way valve may be shifted to the second position, the fourth four-way valve may be shifted to the first position, and the fifth four-way valve may be shifted to the first position. The sixth mode may be selected responsive to each of a mid-load engine condition, and a higher than threshold SCR catalyst NOx load.

The branched exhaust assembly may be operated in a seventh mode with a seventh valve setting to flow exhaust first through the turbine, then through the DOC, then through the DPF and finally through the SCR catalyst. In the seventh valve setting, the first four-way may be shifted to the first position, the second four-way valve may be shifted to the first position, the third four-way valve may be shifted to the first position, the fourth four-way valve may be shifted to the second position, and the fifth four-way valve may be shifted to the second position. The seventh mode may be selected responsive to each of a higher than threshold boost demand during a vehicle acceleration event (or turbo lag), and a higher than threshold DPF soot load.

The branched exhaust assembly may be operated in an eighth mode with an eighth valve setting to flow exhaust first through the turbine, then through the DOC, then through the SCR catalyst and finally through the DPF. In the eighth valve setting, the first four-way may be shifted to the first position, the second four-way valve may be shifted to the first position, the third four-way valve may be shifted to the first position, the fourth four-way valve may be shifted to the first position, and the fifth four-way valve may be shifted to the first position. The eighth mode may be selected responsive to each of a higher than threshold boost demand during a vehicle acceleration event (or turbo lag), and a higher than threshold SCR catalyst NOx load.

The branched exhaust assembly may be operated in a ninth mode with a ninth valve setting to flow a first part of exhaust through the turbine bypassing the DOC, concurrently flowing a second part of exhaust through the DOC bypassing the turbine, then flowing each of the first and the second part of the exhaust through the DPF, and finally through the SCR catalyst. In the ninth valve setting, the first four-way may be shifted to a first position, the second four-way valve may be shifted to the third position, the third four-way valve may be shifted to the third position, the fourth four-way valve may be shifted to the second position, and the fifth four-way valve may be shifted to the second position. The ninth mode may be selected responsive to each of a high engine load (such as peak load) condition, and a higher than threshold DPF soot load.

The branched exhaust assembly may be operated in a tenth mode with a tenth valve setting to flow the first part of exhaust through the turbine bypassing the DOC, concurrently flowing the second part of exhaust through the DOC bypassing the turbine, then flowing each of the first and the second part of the exhaust through the SCR catalyst, and finally through the DPF. In the tenth valve setting, the first four-way may be shifted to a first position, the second four-way valve may be shifted to the third position, the third four-way valve may be shifted to the third position, the fourth four-way valve may be shifted to the first position, and the fifth four-way valve may be shifted to the first position. The tenth mode may be selected responsive to each of a high engine load (peak load) condition, and a higher than threshold SCR catalyst NOx load.

In each of the ninth and the tenth operating mode, a ratio of the first part of exhaust to the second part of exhaust may be based on driver demand and boost error, the second portion decreased while the first portion is correspondingly increased as the driver demand increases, the second portion increased while the first portion is correspondingly decreased as the boost error increases, wherein the boost error includes a difference between an actual boost pressure and a desired boost pressure. In one example, the controller may use a look-up table and/or a map to determine the ratio using on the one or more of driver demand and boost error as input parameters.

In one example, the exhaust assembly may be transitioned from operating in the first to operating in the second mode responsive to each of a higher than threshold NOx loading at the SCR catalyst and a lower than threshold particulate matter loading at the DPF. Similarly, the exhaust assembly may be transitioned from operating in the second mode to operating in the third mode responsive to each of a higher than threshold engine temperature, a higher than threshold particulate matter loading at the DPF, a lower than threshold NOx loading at the SCR catalyst, and engine idling conditions. Further, the exhaust assembly may be transitioned from operating in the third mode to operating in the fourth mode responsive to each of a higher than threshold NOx loading at the SCR catalyst and a lower than threshold particulate matter loading at the DPF. The exhaust assembly may be transitioned from operating in the fourth mode to operating in the fifth mode responsive to a higher than threshold particulate matter loading at the DPF, a lower than threshold NOx loading at the SCR catalyst, and mid-load engine conditions. The exhaust assembly may be transitioned from operating in the fifth to operating in the sixth mode responsive to each of a higher than threshold NOx loading at the SCR catalyst and a lower than threshold particulate matter loading at the DPF. The exhaust assembly may be transitioned from operating in the sixth mode to operating in the seventh mode responsive to each of a higher than threshold particulate matter loading at the DPF, a lower than threshold NOx loading at the SCR catalyst, and vehicle accelerating conditions. The exhaust assembly may be transitioned from operating in the seventh mode to operating in the eighth mode responsive to each of a higher than threshold NOx loading at the SCR catalyst and a lower than threshold particulate matter loading at the DPF. The exhaust assembly may be transitioned from operating in the eighth mode to operating in the ninth mode responsive to each of a higher threshold engine load, higher than threshold particulate matter loading at the DPF, a lower than threshold NOx loading at the SCR catalyst. The exhaust assembly may be transitioned from operating in the ninth mode to operating in the tenth mode responsive to each of a higher than threshold NOx loading at the SCR catalyst and a lower than threshold particulate matter loading at the DPF.

Figure 6A:
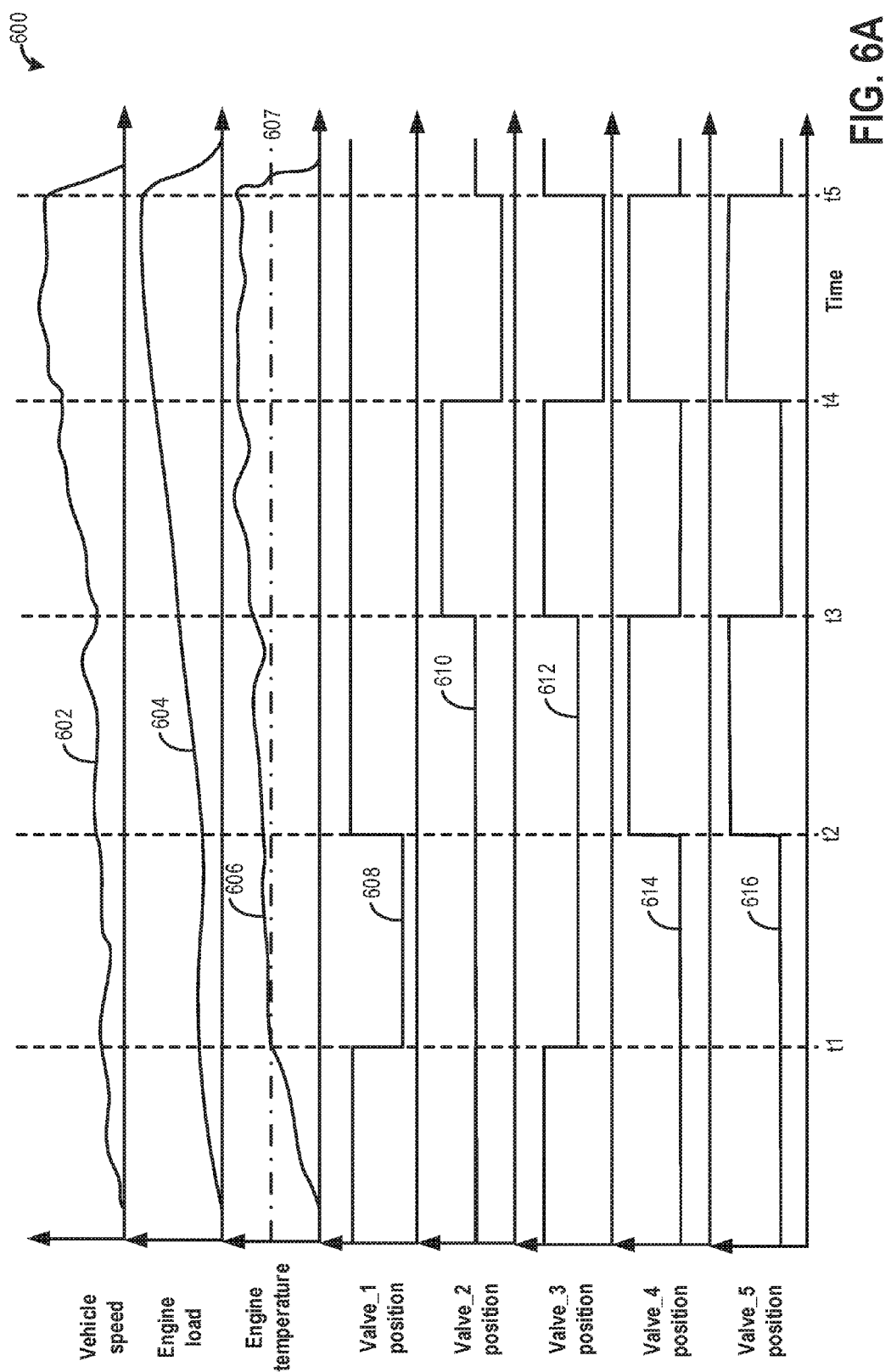
FIG. 6A shows a first part of an example operation of the branched exhaust assembly, according to the present disclosure.
Figure 6B:
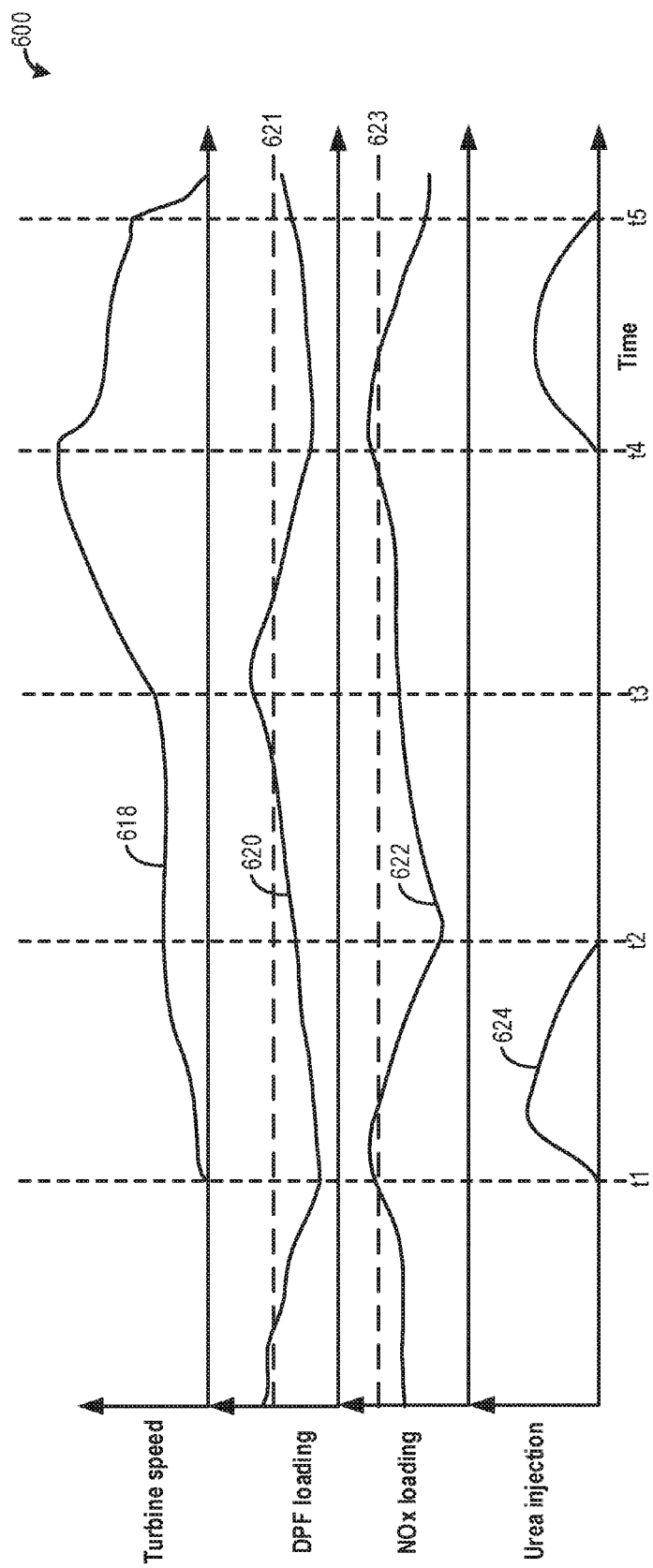
FIG. 6B shows a second part of the example operation of the branched exhaust assembly, according to the present disclosure.
Figure 7:
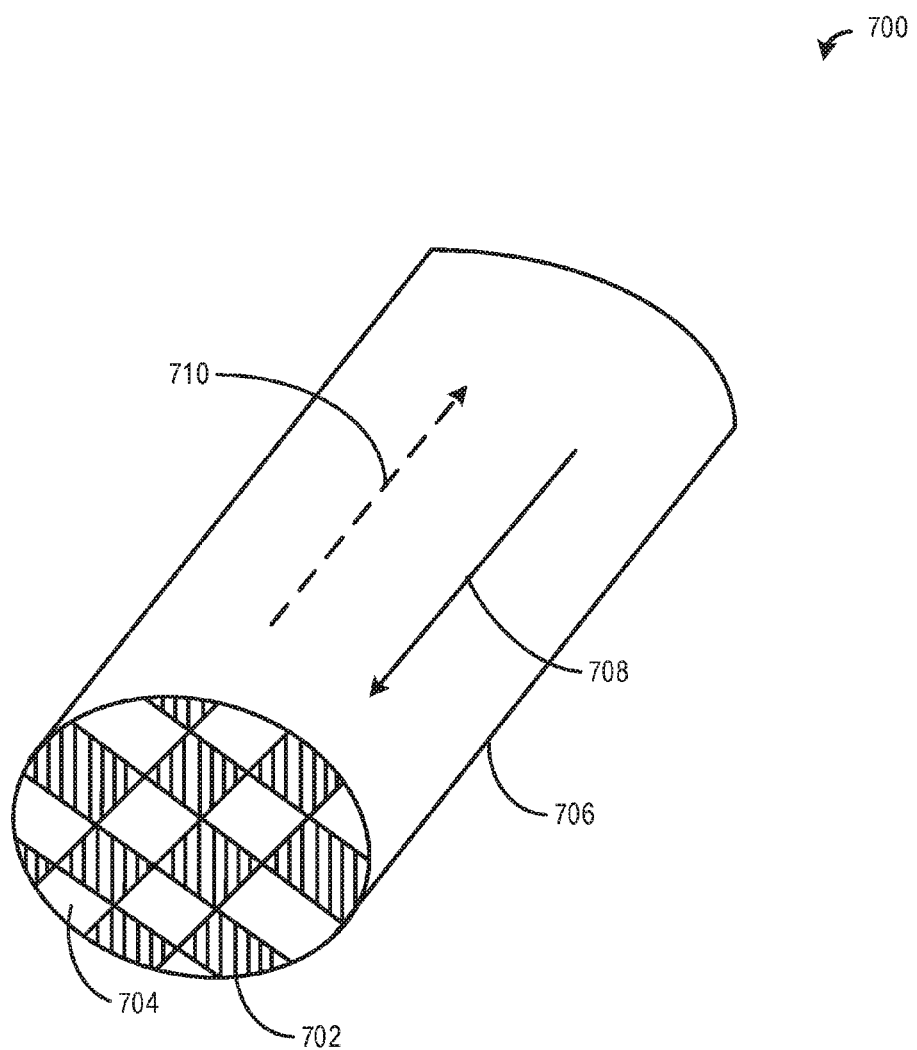
FIG. 7 shows an example embodiment of a cross-section of a diesel particulate filter.

FIGS. 6A and 6B show an example operating sequence 600 of the branched exhaust assembly. The direction of exhaust flow through the different flow paths with different components is determined based on engine operating conditions and a temperature requirement of each component. The horizontal (x-axis) denotes time and the vertical markers t1-t5 identify significant times in the operation of the exhaust bypass system.

In FIG. 6A, the first plot, line 602, shows variation in vehicle speed over time and the second plot, line 604, shows variation in engine load over time. The third plot, line 606, shows change in engine temperature over time. The dotted line 607 denotes a threshold temperature below which the engine temperature may be considered to be low, such as during cold-start conditions. Once the engine temperature increases to above the threshold 607, the engine may be considered to be warm enough for activation of the diesel oxidation catalyst (DOC) (such as DOC 120 in FIG. 1) housed in a second sub-branch of the branched exhaust assembly. The fourth plot, line 608, shows a position of a first four-way valve (valve_1) coupled to the exhaust passage upstream of the branched exhaust assembly. The fifth plot, line 610, shows a position of a second four-way valve (valve_2) coupled to a first end (proximal to exhaust manifold) of a first peripheral branch of the branched exhaust assembly. The sixth plot, line 612, shows a position of a third four-way valve (valve_3) coupled to a second end (proximal to tailpipe) of a first peripheral branch of the branched exhaust assembly. The seventh plot, line 614, shows a position of a fourth four-way valve (valve_4) coupled to a first end (proximal to exhaust manifold) of a second peripheral branch of the branched exhaust assembly. The eighth plot, line 616, shows a position of a fifth four-way valve (valve_5) coupled to a second end (proximal to tailpipe) of a second peripheral branch of the branched exhaust assembly.

In FIG. 6B, the first plot, line 618, shows a variation in speed of an exhaust turbine (such as turbine 116 in FIG. 1) housed in a first sub-branch of the branched exhaust assembly, over time. The second plot, line 620, shows a change in particulate matter (soot) loading on the diesel particulate filter (DPF) (such as DPF 122 in FIG. 1) housed in a third sub-branch of the branched exhaust assembly. Dotted line 621 shows a threshold soot level above which DPF regeneration may be desired. The third plot, line 622, shows a variation in NOx loading in the selective catalytic reduction (SCR) catalyst (such as SCR catalyst 124 in FIG. 1) housed in a fourth sub-branch of the branched exhaust assembly. Dotted line 623 shows a threshold NOx loading above which SCR catalyst purge may be desired. The fourth plot, line 624, shows urea injection during SCR catalyst purge.

Prior to time t1, the engine starts from rest after a period of inactivity during which the vehicle was not being propelled and therefore an engine cold-start is inferred. The engine may start under cold-start conditions with low engine temperature (below the threshold temperature 607). During this time, the vehicle speed gradually increases and the engine load is low. Due to the cold-start conditions, the DOC may not have attained its light-off temperature. Therefore, during this time, in order to expedite catalyst warming, the controller may route hot exhaust first through the DOC. To route hot exhaust first through the DOC, valve_1 may be shifted to a first position, valve_2 may be shifted to a second position, and valve_3 may be shifted to a first position. Due to the given valve setting, the entire volume of hot exhaust may first flow through the DOC, wherein heat from the exhaust may be utilized to increase the DOC temperature. The exhaust may not flow through the turbine, and consequently the turbine may not be spun-up. During this time, the soot level at the DPF may be higher than the threshold loading. In order to facilitate complete regeneration of the DPF, hot exhaust exiting the DOC may be routed through the DPF. In order to route the exhaust first through the DPF and then through the SCR catalyst, valve_4 may be shifted to a second position, and valve_5 may be shifted to a second position. Due to the regeneration event, the soot level on the DPF may gradually reduce to below the threshold level. While passing through the SCR catalyst, NOx from the exhaust may get adsorbed at the SCR catalyst. The exhaust may be released to the atmosphere via the tailpipe after flowing through the SCR catalyst.

At time t1, as the engine temperature increases to higher than the threshold temperature, it may be inferred that the DOC has attained the light-off temperature and is activated. As such, after activation, owing to a coating on the catalyst surface, the DOC may have higher conversion efficiencies at lower exhaust temperatures. At this time, the NOX loading at the SCR catalyst may increase to above the threshold level and SCR catalyst purge may be initiated. Between time t1 and t2, the engine may operate at idling conditions and lower boost may be desired. In order to initiate SCR catalyst purge while providing lower boost, the hot exhaust may be first routed through the SCR catalyst and then later through the turbine. To route hot exhaust first through the SCR catalyst, valve_1 may be shifted to a second position, valve_2 may be shifted to a second position, valve_3 may be shifted to a second position, valve_4 may be shifted to a second position, and valve_5 may be shifted to a second position. Due to the given valve setting, the entire volume of hot exhaust may first flow through the SCR catalyst, wherein heat from the exhaust may be utilized to increase the temperature of the catalyst which facilitates in NOx reduction. To further support the reduction process, urea may be injected from an injector coupled to the fourth sub-branch, to the exhaust stream entering the SCR catalyst. The water and nitrogen produced by the reduction reaction may be removed from the SCR catalyst by the exhaust stream. After exiting the SCR catalyst, the exhaust may flow through the DPF wherein PM may be deposited on a first set of channels while ash accumulated (during prior regeneration) in the second (remaining) set of channels may be removed by the exhaust flow. After passing through the DPF, the exhaust may flow through the turbine to spin-up the turbine and provide a desired boost. Finally the exhaust may flow through the DOC before exiting to the atmosphere.

At time t2, the engine load may increase to mid-load conditions, in response to which, a higher boost may be desired for engine operation. Also, temperature of the DOC may have to be maintained at an optimal operating temperature. At this time, valve_1 may be shifted to a second position, valve_2 may be maintained at a second position, valve_3 may be maintained at a second position, valve_4 may be shifted to a first position, and valve_5 may be shifted a first position. Due to the position of the valves, the exhaust may first flow through the DOC and then through the turbine. The heat from the exhaust may be used to maintain the optimal operating temperature to the DOC and provide the desired boost. Between time t2, and t3, the soot level on the DPF may be lower than the threshold loading, and the NOx level at the SCR catalyst may also be lower than the threshold level. During this time, exhaust may flow through the SCR catalyst depositing the NOx onto the catalyst and then flow through the DPF. The exhaust may flow through the DPF in a direction opposite to the direction of exhaust flow through the DPF between time t1 and t2. Therefore, PM may be deposited in the second set of channels and simultaneously ash may be removed from the first set of channels.

At time t3, the vehicle may start accelerating, and the vehicle speed may increase. In response to the acceleration, the demand for boost may increase. In order to provide the desired boost, the hot exhaust may be first routed through the turbine. To route hot exhaust first through the turbine, valve_1 may be shifted to a first position, valve_2 may be shifted to a first position, and valve_3 may be shifted to a first position. Due to the given valve setting, the entire volume of hot exhaust may first flow through the turbine, which may cause an increase in turbine speed and provide a higher boost. The exhaust exiting the turbine may then flow through the DOC. At this time, the soot level at the DPF may increase to above the threshold load, therefore in order to facilitate DPF regeneration, exhaust may be routed to flow through DPF before flowing through the SCR. In order to route hot exhaust through the DPF, valve_4 may be shifted to the second position, and valve_5 may be shifted to the second position. Between time t3, and t4, the regeneration may progress and the soot level on the DPF may steadily decrease to below the threshold level. After passing through the DPF, the exhaust may flow through the SCR catalyst and be released to the atmosphere through the tailpipe.

At time t4, the vehicle may stop accelerating and the engine may operate under peak (higher) load conditions. Due to the higher load conditions, between time t4 and t5, the flow of exhaust may increase substantially and the entire volume of exhaust may not be routed through the turbine in order to reduce boost error and avoid damage to the turbocharger components. Instead, the entire volume of exhaust may be divided into two parts and the two parts may be routed via two different flow paths of the branched assembly, simultaneously. The ratio of the two parts may depend on driver demand and boost error. Therefore, during this time, in order to simultaneously route exhaust via two flow paths, valve_1 may be maintained at a first position, valve_2 may be shifted to a third position, and valve_3 may be shifted to a third position. Due to the given valve setting, a first portion of the exhaust may be routed through the turbine, bypassing the DOC, wherein the exhaust may be utilized to provide boost to the engine. A second portion of the exhaust may be routed through the DOC, bypassing the turbine. During this time, the NOx loading on the SCR catalyst may increase to the higher than threshold level, and SCR catalyst purge may be desired. Therefore, in order to route exhaust through the SCR before flowing through the DPF, valve_4 may be shifted to the first position, and valve_5 may be shifted to the first position. Due to the position of the valves, after exiting the turbine and the DOC, the first and the second portions of the exhaust may combine and then flow through the SCR catalyst. Urea may be injected into the exhaust stream flowing through the SCR catalyst and the heat from the exhaust may be utilized in maintaining the higher temperature desired during the NOx reduction. After exiting the SCR catalyst, the exhaust may flow through the DPF wherein PM may be deposited in the second set of channels and simultaneously ash may be removed from the first set of channels.

At time t5, the vehicle brakes may be applied and there may be an engine shutdown request, owing to which, vehicle speed and engine load may gradually reduce to zero. At this time, the valve setting of each of the exhaust assembly valves may be shifted to the default setting wherein the valve_1 may be shifted to the first position, valve_2 may be shifted to the second position, valve_3 may be shifted to the first position, valve_4 may be shifted to the second position, and valve_5 may be shifted to the second position. Due to this valve setting, the exhaust bypass assembly may optimally operate during an upcoming cold-start condition. In this way, temperature demand of each of the turbine, the DOC, the DPF, and the SCR may be inferred based on one or more of desired boost, engine temperature, DPF soot loading, and SCR catalyst NOx loading, and accordingly an order of exhaust flow through each of the components may be adjusted.

One example method for an engine vehicle comprises adjusting a plurality of valves coupled to each of a first, second, third, and fourth sub-branch of a branched exhaust system, each sub-branch arranged parallel to a main exhaust passage and housing a distinct exhaust component; and varying an order of exhaust flow through the distinct exhaust components based on temperature. In the preceding example, additionally or optionally, each of the plurality of valves is adjustable to one of a first position, a second position, and a third position intermediate to the first and second position. In any or all of the preceding examples, additionally or optionally, the first and second sub-branches are arranged on one side of the main exhaust passage while the third and fourth sub-branches are arranged on another side of the main exhaust passage, opposite the one side, and wherein varying the order of exhaust flow includes diverting all exhaust flow initially towards the first and second sub-branch during a first condition when one or more of the temperature is lower than a threshold, and an engine speed is higher than a threshold and diverting all exhaust flow initially towards the third and fourth sub-branch during a second condition when one or more of the temperature is higher than the threshold, and the engine speed is lower than a threshold. In any or all of the preceding examples, additionally or optionally, the plurality of valves further includes a second diverter valve located upstream of the first and second sub-branch, a third diverter valve located downstream of the first and second sub-branch, a fourth diverter valve located upstream of the third and fourth sub-branch, and a fifth diverter valve located downstream of the third and fourth sub-branch, wherein each of the second, third, fourth and fifth diverter valves are located downstream of the first diverter valve. In any or all of the preceding examples, additionally or optionally, the varying further includes: routing all the exhaust flow through the first sub-branch and then through the second sub-branch when the temperature is higher than the threshold; routing all the exhaust flow through the second sub-branch and then through the second branch, bypassing the first sub-branch when the temperature is lower than the threshold; routing all the exhaust flow through the fourth sub-branch and then through the third sub-branch when NOx loading at a selective catalytic reduction (SCR) catalyst is higher than a threshold; and routing all the exhaust flow through the third sub-branch and then through the fourth sub-branch when soot loading at a diesel particulate filter (DPF) is higher than a threshold. In any or all of the preceding examples, additionally or optionally, the first and the second branch are separated by a fifth sub-branch arranged parallel to both the first and second branch such that exhaust flow between the first sub-branch and the second sub-branch is via the fifth sub-branch, and wherein the third and the fourth sub-branch are separated by a sixth sub-branch arranged parallel to both such that exhaust flow between the third sub-branch and the fourth sub-branch is via the sixth sub-branch. In any or all of the preceding examples, additionally or optionally, the first sub-branch houses a turbine, the second sub-branch houses a diesel oxidation catalyst (DOC), the third sub-branch houses the DPF, and the fourth branch houses the SCR catalyst. In any or all of the preceding examples, additionally or optionally, varying the order of exhaust flow based on temperature includes adjusting based on a relative temperature demand of each distinct exhaust component. In any or all of the preceding examples, additionally or optionally, the varying includes: responsive to vehicle acceleration, based on a higher temperature demand at the turbine, routing exhaust first through the turbine before routing exhaust through each of the DOC, the DPF, and the SCR catalyst, responsive to an engine cold-start, based on a higher temperature demand at the DOC, routing exhaust first through the DOC before routing exhaust through each of the DPF, and the SCR catalyst, responsive to DPF regeneration conditions being met, based on a higher temperature demand at the DPF, routing exhaust first through the DPF and then through each of the SCR catalyst, the turbine, and the DOC, and responsive to SCR purge conditions being met, based on a higher temperature demand at the SCR, routing exhaust first through the SCR and then through each of the DPF, the DOC, and the turbine. In any or all of the preceding examples, additionally or optionally, the varying includes: during a first DPF regeneration condition when engine temperature is below a threshold, flowing exhaust first through the DOC, then through the DPF, and finally through the SCR catalyst, bypassing the turbine, during a second DPF regeneration condition when the engine temperature is above the threshold, and engine load is in a mid-load region, flowing exhaust first through the DOC, then through the turbine, then through the DPF, and finally through the SCR catalyst, during a third DPF regeneration condition when the vehicle is accelerating, flowing exhaust first through the turbine, then through the DOC, then through the DPF, and finally through the SCR catalyst, and during a fourth DPF regeneration condition when the engine temperature is above the threshold, and engine load is higher than a threshold load, flowing a first part of exhaust first through the turbine, bypassing the DOC, and a second part of exhaust first through the DOC, bypassing the turbine, then flowing a combined first and second part through the DPF, and finally through the SCR catalyst. In any or all of the preceding examples, additionally or optionally, the varying further includes: during a first SCR catalyst purge condition when engine temperature is below a threshold, flowing exhaust first through the DOC, then through the SCR catalyst, and finally through the DPF, bypassing the turbine, during a second DPF regeneration condition when the engine temperature is above the threshold, and engine load is in a mid-load region, flowing exhaust first through the DOC, then through the turbine, then through the SCR catalyst, and finally through the DPF, during a third SCR catalyst purge condition when the vehicle is accelerating, flowing exhaust first through the turbine, then through the DOC, then through the SCR catalyst, and finally through the DPF, and during a fourth SCR catalyst purge condition when the engine temperature is above the threshold, and engine load is higher than a threshold load, flowing a first part of exhaust first through the turbine, bypassing the DOC, and a second part of exhaust first through the DOC, bypassing the turbine, then flowing a combined first and second part through the SCR catalyst, and finally through the DPF. In any or all of the preceding examples, additionally or optionally, the varying further includes: during a fifth DPF regeneration condition when the engine temperature is above the threshold, and engine load is below an idle load threshold, flowing exhaust first through the DPF, then through the SCR catalyst, then through the turbine, and finally through the DOC, and during a fifth SCR catalyst purge condition when the engine temperature is above the threshold, and engine load is below an idle load threshold, flowing exhaust first through the SCR catalyst, then through the DPF, then through the turbine, and finally through the DOC. Any or all of the preceding examples, further comprises, additionally or optionally, during each of the first, second, third, and fourth SCR purge conditions, flowing exhaust through the DPF in a first direction, and during the fifth SCR purge condition, flowing exhaust through the DPF in a second direction, the first direction opposite to the second direction, wherein during exhaust flow through DPF in the first direction, ash is removed from a first set of cells of the DPF, and during exhaust flow through DPF in second direction, ash is removed from a second remaining set of cells of the DPF. In any or all of the preceding examples, additionally or optionally, a ratio of the first part of exhaust to the second part of exhaust is based on driver demand and boost error, the second portion decreased while the first portion is correspondingly increased g as the driver demand increases, the second portion increased while the first portion is correspondingly decreased as the boost error increases, wherein the boost error includes a difference between an actual boost pressure and a desired boost pressure. Any or all of the preceding examples, further comprising, additionally or optionally, during each of the first, second, this, fourth and fifth SCR purge condition, injecting a reducing agent upstream of the SCR catalyst via an injector coupled to the fourth sub-branch, wherein the reducing agent is urea.

Another example system for an engine exhaust system comprises: a main exhaust passage, a branched exhaust assembly with a first peripheral branch and a second peripheral branch branching from the main exhaust passage, a first sub-branch, a second sub-branch, and a fifth central sub-branch branching from the first peripheral branch, a third sub-branch, a fourth sub-branch, and a sixth central sub-branch branching from the second peripheral branch, wherein each of the first sub-branch, the second sub-branch, and the fifth central sub-branch are positioned on a first side of the main exhaust passage, and each third sub-branch, a fourth sub-branch, and a sixth central sub-branch are positioned on a second side of the main exhaust passage, the first side opposite to the second side. The preceding example, further comprises, additionally or optionally, a first four-way valve coupled to the main passage upstream of each of the first and the second peripheral branch, a second four-way valve coupled to the first peripheral branch upstream of each of the first sub-branch, the second sub-branch, and the fifth central sub-branch, a third four-way valve coupled to the first peripheral branch downstream of each of the first sub-branch, the second sub-branch, and the fifth central sub-branch, a fourth four-way valve coupled to the second peripheral branch upstream of each of the third sub-branch, the fourth sub-branch, and the sixth central sub-branch, and a fifth four-way valve coupled to the first peripheral branch downstream of each of the third sub-branch, the fourth sub-branch, and the sixth central sub-branch. Any or all of the preceding examples, further comprises, additionally or optionally, a controller with computer readable instructions stored on non-transitory memory for: actuating the first four-way valve to flow exhaust from the main exhaust passage upstream of the branched exhaust assembly to each of the first and the second peripheral branch, then to the main exhaust passage downstream of the branched exhaust assembly, and then to a tailpipe, an order of flowing through each of the first and the second peripheral branch based on temperature-based priority of exhaust components housed in the first peripheral branch relative to the second peripheral branch, actuating each of the second four-way valve and the third four-way valve to flow exhaust through one or both of the first and the second sub-branch, an order of flowing through each of the first and the second sub-branch based on temperature-based priority of exhaust components housed in the first sub-branch relative to the second sub-branch, and actuating each of the fourth four-way valve and the fifth four-way valve to flow exhaust through one or both of the third and the fourth sub-branch, an order of flowing through each of the third and the fourth sub-branch based on temperature-based priority of exhaust components housed in the third sub-branch relative to the fourth sub-branch.

In yet another example an engine system comprising: an intake manifold, an exhaust manifold, a branched exhaust assembly with a first peripheral branch comprising a first sub-branch, and a second sub-branch, and a second peripheral branch comprising a third sub-branch, and a fourth sub-branch, a first four-way valve coupled to the exhaust manifold upstream of each of the first peripheral branch, and the second peripheral branch, a second four-way valve coupled to a first end of the first peripheral branch, and a third four-way valve coupled to a second end of the first peripheral branch, a fourth four-way valve coupled to a first end of the second peripheral branch, and a fifth four-way valve coupled to a second end of the second peripheral branch, turbine coupled to the first sub-branch, a diesel oxidation catalyst (DOC) coupled to the second sub-branch, a diesel particulate filter (DPF) coupled to the third sub-branch, a selective catalytic reduction (SCR) catalyst coupled to the fourth sub-branch, and a controller with computer readable instructions stored on non-transitory memory for: inferring temperature demand of each of the turbine, the DOC, the DPF, and the SCR, based on one or more of desired boost, engine temperature, DPF soot loading, and SCR catalyst NOx loading, and when turbine temperature demand is higher than DOC, actuating each of the first valve, the second valve, and the third valve, to flow exhaust first through the turbine, when DPF temperature demand is higher than SCR catalyst, actuating each of the first valve, the fourth valve, and the fifth valve, to flow exhaust first through the DPF. In the preceding example, additionally or optionally, the controller includes further instructions for: operating the branched exhaust assembly in a first mode with a first valve setting to flow exhaust first through the DOC, then through the DPF, and finally through the SCR catalyst, operating in a second mode with a second valve setting to flow exhaust first through the DOC, then through the SCR catalyst, and finally through the DPF, operating in a third mode with a third valve setting to flow exhaust first through the DPF, then through the SCR catalyst, then through the turbine and finally through the DOC, operating in a fourth mode with a fourth valve setting to flow exhaust first through the SCR catalyst, then through the DPF, then through the turbine and finally through the DOC, operating in a fifth mode with a fifth valve setting to flow exhaust first through the DOC, then through the turbine, then through the DPF and finally through the SCR catalyst, operating in a sixth mode with a sixth valve setting to flow exhaust first through the DOC, then through the turbine, then through the SCR catalyst and finally through the DPF, operating in a seventh mode with a seventh valve setting to flow exhaust first through the turbine, then through the DOC, then through the DPF and finally through the SCR catalyst, operating in an eighth mode with an eighth valve setting to flow exhaust first through the turbine, then through the DOC, then through the SCR catalyst and finally through the DPF, operating in a ninth mode with a ninth valve setting to flow a first part of exhaust through the turbine bypassing the DOC, concurrently flowing a second part of exhaust through the DOC bypassing the turbine, then flowing each of the first and the second part of the exhaust through the DPF, and finally through the SCR catalyst, and operating in a tenth mode with a tenth valve setting to flow the first part of exhaust through the turbine bypassing the DOC, concurrently flowing the second part of exhaust through the DOC bypassing the turbine, then flowing each of the first and the second part of the exhaust through the SCR catalyst, and finally through the DPF. In any or all of the preceding examples, additionally or optionally, the controller includes further instructions for: selecting the first mode responsive to each of a lower than threshold engine temperature, and a higher than threshold DPF soot load, selecting the second mode responsive to each of a lower than threshold engine temperature, and a higher than threshold SCR catalyst NOx load, selecting the third mode responsive to each of an engine idling condition, and a higher than threshold DPF soot load, selecting the fourth mode responsive to each of an engine idling condition, and a higher than threshold SCR catalyst NOx load, selecting the fifth mode responsive to each of a mid-load engine condition, and a higher than threshold DPF soot load, selecting the sixth mode responsive to each of a mid-load engine condition, and a higher than threshold SCR catalyst NOx load, selecting the seventh mode responsive to each of a vehicle acceleration event, and a higher than threshold DPF soot load, selecting the eighth mode responsive to each of a vehicle acceleration event, and a higher than threshold SCR catalyst NOx load, selecting the ninth mode responsive to each of a high engine load condition, and a higher than threshold DPF soot load, and selecting the tenth mode responsive to each of a high engine load condition, and a higher than threshold SCR catalyst NOx load. In any or all of the preceding examples, additionally or optionally, transitioning from the first to the second mode based on each of a higher than threshold NOx loading at the SCR catalyst and a lower than threshold particulate matter loading at the DPF, transitioning from the second to the third mode based on each of a higher than threshold engine temperature, a higher than threshold particulate matter loading at the DPF, a lower than threshold NOx loading at the SCR catalyst, and engine idling conditions, transitioning from the third to the fourth mode based on each of a higher than threshold NOx loading at the SCR catalyst and a lower than threshold particulate matter loading at the DPF, transitioning from the fourth to the fifth mode based on each of a higher than threshold particulate matter loading at the DPF, a lower than threshold NOx loading at the SCR catalyst, and mid-load engine conditions, transitioning from the fifth to the sixth mode based on each of a higher than threshold NOx loading at the SCR catalyst and a lower than threshold particulate matter loading at the DPF, transitioning from the sixth to the seventh mode based on each of a higher than threshold particulate matter loading at the DPF, a lower than threshold NOx loading at the SCR catalyst, and vehicle accelerating conditions, transitioning from the seventh to the eighth mode based on each of a higher than threshold NOx loading at the SCR catalyst and a lower than threshold particulate matter loading at the DPF, transitioning from the eighth to the ninth mode based on each of a higher threshold engine load, higher than threshold particulate matter loading at the DPF, a lower than threshold NOx loading at the SCR catalyst, transitioning from the ninth to the tenth mode based on each of a higher than threshold NOx loading at the SCR catalyst and a lower than threshold particulate matter loading at the DPF.

In this way, by routing exhaust through different flow paths of a branched exhaust assembly, it is possible to provide exhaust heat to each component of the exhaust system based on engine operating conditions, and the distinct heat requirements of the components. For example, exhaust may be routed through each of an exhaust turbine, a DOC, a DPF, and an SCR catalyst with the order of flow adjusted based on each of boost demand, DOC temperature, DPF loading, and SCR NOx loading. By changing the order of exhaust flow through the branched exhaust assembly, heat requirements of each of the components may be met even when they have conflicting heat requirements, and overall back pressure generated in the exhaust system may be reduced. By first flowing exhaust through the DOC, bypassing the turbine, attainment of DOC light-off temperature may be expedited during cold-start conditions. By simultaneously flowing exhaust through two flow paths, partially bypassing the turbine, reliance on a dedicated waste-gate may be reduced during higher load conditions without compromising boosted engine performance. By flowing through the DPF in opposite directions during different operating modes, ash accumulated in alternating DPF channels may be completely removed. The technical effect of using a plurality of four-way valves to regulate an order of exhaust flow through the exhaust components housed in distinct sub-branches of a branched exhaust assembly is that the order of exhaust flow through each sub-branch may be regulated based on the heat requirement of the exhaust component housed on the sub-branch. Overall, by regulating an order of exhaust flow through a plurality of exhaust components, engine efficiency, emissions quality, and fuel efficiency may be improved in a boosted engine system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
adjusting a plurality of valves coupled to each of a first, second, third, and fourth sub-branch of a branched exhaust system, each sub-branch arranged parallel to a main exhaust passage and housing a distinct exhaust component; and
varying an order of exhaust flow through the distinct exhaust components based on a temperature, wherein each of the plurality of valves is adjustable to one of a first position, a second position, and a third position intermediate to the first and second positions.

2. The method of claim 1, wherein the first and second sub-branches are arranged on one side of the main exhaust passage while the third and fourth sub-branches are arranged on another side of the main exhaust passage, opposite the one side, and wherein varying the order of exhaust flow includes diverting all exhaust flow initially towards the first and second sub-branches during a first condition when the temperature is lower than a threshold temperature and/or an engine speed is higher than a threshold speed, and diverting all exhaust flow initially towards the third and fourth sub-branches during a second condition when the temperature is higher than the threshold temperature and/or the engine speed is lower than the threshold speed.

3. The method of claim 2, wherein the varying further includes:
routing all exhaust flow through the first sub-branch and then through the second sub-branch when the temperature is higher than the threshold temperature;
routing all exhaust flow through the second sub-branch and then through a second branch, bypassing the first sub-branch when the temperature is lower than the threshold temperature;
routing all exhaust flow through the fourth sub-branch and then through the third sub-branch when NOx loading at a selective catalytic reduction (SCR) catalyst is higher than a threshold loading; and
routing all exhaust flow through the third sub-branch and then through the fourth sub-branch when soot loading at a diesel particulate filter (DPF) is higher than a threshold soot load.

4. The method of claim 2, wherein the first and second sub-branches are separated by a fifth sub-branch arranged parallel to both the first and second sub-branches such that exhaust flow between the first sub-branch and the second sub-branch is via the fifth sub-branch, and wherein the third and fourth sub-branches are separated by a sixth sub-branch arranged parallel to both such that exhaust flow between the third sub-branch and the fourth sub-branch is via the sixth sub-branch.

5. The method of claim 3, wherein the first sub-branch houses a turbine, the second sub-branch houses a diesel oxidation catalyst (DOC), the third sub-branch houses the DPF, and the fourth sub-branch houses the SCR catalyst.

6. The method of claim 5, wherein varying the order of exhaust flow based on the temperature includes adjusting based on a relative temperature demand of each distinct exhaust component.

7. The method of claim 6, wherein the varying includes:
responsive to a vehicle acceleration, based on a higher temperature demand at the turbine, routing exhaust first through the turbine before routing exhaust through each of the DOC, the DPF, and the SCR catalyst;
responsive to an engine cold-start, based on a higher temperature demand at the DOC, routing exhaust first through the DOC before routing exhaust through each of the DPF and the SCR catalyst;
responsive to DPF regeneration conditions being met, based on a higher temperature demand at the DPF, routing exhaust first through the DPF and then through each of the SCR catalyst, the turbine, and the DOC; and
responsive to SCR purge conditions being met, based on a higher temperature demand at the SCR, routing exhaust first through the SCR and then through each of the DPF, the DOC, and the turbine.

8. The method of claim 6, wherein the varying includes:
during a first DPF regeneration condition when an engine temperature is below a threshold temperature, flowing exhaust first through the DOC, then through the DPF, and finally through the SCR catalyst, bypassing the turbine;
during a second DPF regeneration condition when the engine temperature is above the threshold temperature, and an engine load is in a mid-load region, flowing exhaust first through the DOC, then through the turbine, then through the DPF, and finally through the SCR catalyst;
during a third DPF regeneration condition when a vehicle is accelerating, flowing exhaust first through the turbine, then through the DOC, then through the DPF, and finally through the SCR catalyst; and
during a fourth DPF regeneration condition when the engine temperature is above the threshold temperature and the engine load is higher than a threshold load, flowing a first part of exhaust first through the turbine, bypassing the DOC, and a second part of exhaust first through the DOC, bypassing the turbine, then flowing a combined first and second parts of exhaust through the DPF, and finally through the SCR catalyst.

9. The method of claim 8, wherein the varying further includes:
during a first SCR catalyst purge condition when the engine temperature is below the threshold temperature, flowing exhaust first through the DOC, then through the SCR catalyst, and finally through the DPF, bypassing the turbine;
during a second SCR catalyst purge condition when the engine temperature is above the threshold temperature and the engine load is in the mid-load region, flowing exhaust first through the DOC, then through the turbine, then through the SCR catalyst, and finally through the DPF;
during a third SCR catalyst purge condition when the vehicle is accelerating, flowing exhaust first through the turbine, then through the DOC, then through the SCR catalyst, and finally through the DPF; and
during a fourth SCR catalyst purge condition when the engine temperature is above the threshold temperature and the engine load is higher than the threshold load, flowing a first part of exhaust first through the turbine, bypassing the DOC, and a second part of exhaust first through the DOC, bypassing the turbine, then flowing a combined first and second parts of exhaust through the SCR catalyst, and finally through the DPF.

10. The method of claim 9, wherein the varying further includes:
during a fifth DPF regeneration condition when the engine temperature is above the threshold temperature and the engine load is below an idle load threshold, flowing exhaust first through the DPF, then through the SCR catalyst, then through the turbine, and finally through the DOC; and
during a fifth SCR catalyst purge condition when the engine temperature is above the threshold temperature and the engine load is below the idle load threshold, flowing exhaust first through the SCR catalyst, then through the DPF, then through the turbine, and finally through the DOC.

11. The method of claim 10, further comprising, during each of the first, second, third, and fourth SCR purge conditions, flowing exhaust through the DPF in a first direction and, during the fifth SCR purge condition, flowing exhaust through the DPF in a second direction, the first direction opposite to the second direction, wherein, during exhaust flow through the DPF in the first direction, ash is removed from a first set of cells of the DPF and, during exhaust flow through the DPF in the second direction, ash is removed from a second remaining set of cells of the DPF.

12. The method of claim 8, wherein a ratio of the first part of exhaust to the second part of exhaust is based on a driver demand and a boost error, the second part of exhaust decreased while the first part of exhaust is correspondingly increased as the driver demand increases, and the second part of exhaust increased while the first part of exhaust is correspondingly decreased as the boost error increases, wherein the boost error includes a difference between an actual boost pressure and a desired boost pressure.

13. An exhaust system comprising:
a main exhaust passage;
a branched exhaust assembly with a first peripheral branch and a second peripheral branch branching from the main exhaust passage;
a first sub-branch, a second sub-branch, and a fifth central sub-branch branching from the first peripheral branch;
a third sub-branch, a fourth sub-branch, and a sixth central sub-branch branching from the second peripheral branch;
wherein each of the first sub-branch, the second sub-branch, and the fifth central sub-branch are positioned on a first side of the main exhaust passage, and each of the third sub-branch, the fourth sub-branch, and the sixth central sub-branch are positioned on a second side of the main exhaust passage, the first side opposite to the second side.

14. The system of claim 13, further comprising:
a first four-way valve coupled to the main exhaust passage upstream of each of the first and second peripheral branches;
a second four-way valve coupled to the first peripheral branch upstream of each of the first sub-branch, the second sub-branch, and the fifth central sub-branch;
a third four-way valve coupled to the first peripheral branch downstream of each of the first sub-branch, the second sub-branch, and the fifth central sub-branch;
a fourth four-way valve coupled to the second peripheral branch upstream of each of the third sub-branch, the fourth sub-branch, and the sixth central sub-branch; and a fifth four-way valve coupled to the second peripheral branch downstream of each of the third sub-branch, the fourth sub-branch, and the sixth central sub-branch.

15. The system of claim 14, further comprising a controller with computer readable instructions stored on non-transitory memory for:
   actuating the first four-way valve to flow exhaust from the main exhaust passage upstream of the branched exhaust assembly to each of the first and second peripheral branches, then to the main exhaust passage downstream of the branched exhaust assembly, and then to a tailpipe, an order of flowing through each of the first and second peripheral branches based on a temperature-based priority of exhaust components housed in the first peripheral branch relative to the second peripheral branch;
   actuating each of the second four-way valve and the third four-way valve to flow exhaust through one or both of the first and second sub-branches, an order of flowing through each of the first and second sub-branches based on the temperature-based priority of exhaust components housed in the first sub-branch relative to the second sub-branch; and
   actuating each of the fourth four-way valve and the fifth four-way valve to flow exhaust through one or both of the third and fourth sub-branches, an order of flowing through each of the third and fourth sub-branches based on the temperature-based priority of exhaust components housed in the third sub-branch relative to the fourth sub-branch.

16. An engine system comprising:
   an intake manifold;
   an exhaust manifold;
   a branched exhaust assembly with a first peripheral branch comprising a first sub-branch and a second sub-branch, and a second peripheral branch comprising a third sub-branch and a fourth sub-branch;
   a first four-way valve coupled to the exhaust manifold upstream of each of the first peripheral branch and the second peripheral branch;
   a second four-way valve coupled to a first end of the first peripheral branch, and a third four-way valve coupled to a second end of the first peripheral branch;
   a fourth four-way valve coupled to a first end of the second peripheral branch, and a fifth four-way valve coupled to a second end of the second peripheral branch;
   a turbine coupled to the first sub-branch;
   a diesel oxidation catalyst (DOC) coupled to the second sub-branch;
   a diesel particulate filter (DPF) coupled to the third sub-branch;
   a selective catalytic reduction (SCR) catalyst coupled to the fourth sub-branch; and
   a controller with computer readable instructions stored on non-transitory memory for:
      inferring temperature demand of each of the turbine, the DOC, the DPF, and the SCR catalyst, based on one or more of desired boost, engine temperature, DPF soot loading, and SCR catalyst NOx loading; and
      when the turbine temperature demand is higher than the DOC temperature demand, actuating each of the first four-way valve, the second four-way valve, and the third four-way valve to flow exhaust first through the turbine, and, when the DPF temperature demand is higher than the SCR catalyst temperature demand, actuating each of the first four-way valve, the fourth four-way valve, and the fifth four-way valve to flow exhaust first through the DPF.

17. The system of claim 16, wherein the controller includes further instructions for:
   operating the branched exhaust assembly in a first mode with a first valve setting to flow exhaust first through the DOC, then through the DPF, and finally through the SCR catalyst;
   operating in a second mode with a second valve setting to flow exhaust first through the DOC, then through the SCR catalyst, and finally through the DPF;
   operating in a third mode with a third valve setting to flow exhaust first through the DPF, then through the SCR catalyst, then through the turbine, and finally through the DOC;
   operating in a fourth mode with a fourth valve setting to flow exhaust first through the SCR catalyst, then through the DPF, then through the turbine, and finally through the DOC;
   operating in a fifth mode with a fifth valve setting to flow exhaust first through the DOC, then through the turbine, then through the DPF, and finally through the SCR catalyst;
   operating in a sixth mode with a sixth valve setting to flow exhaust first through the DOC, then through the turbine, then through the SCR catalyst, and finally through the DPF;
   operating in a seventh mode with a seventh valve setting to flow exhaust first through the turbine, then through the DOC, then through the DPF, and finally through the SCR catalyst;
   operating in an eighth mode with an eighth valve setting to flow exhaust first through the turbine, then through the DOC, then through the SCR catalyst, and finally through the DPF;
   operating in a ninth mode with a ninth valve setting to flow a first part of exhaust through the turbine, bypassing the DOC, concurrently flowing a second part of exhaust through the DOC, bypassing the turbine, then flowing each of the first and second parts of the exhaust through the DPF, and finally through the SCR catalyst; and
   operating in a tenth mode with a tenth valve setting to flow the first part of exhaust through the turbine, bypassing the DOC, concurrently flowing the second part of exhaust through the DOC, bypassing the turbine, then flowing each of the first and second parts of the exhaust through the SCR catalyst, and finally through the DPF.

18. The system of claim 17, wherein the controller includes further instructions for:
   selecting the first mode responsive to each of a lower than threshold engine temperature and a higher than threshold DPF soot load;
   selecting the second mode responsive to each of the lower than threshold engine temperature and a higher than threshold SCR catalyst NOx load;
   selecting the third mode responsive to each of an engine idling condition and the higher than threshold DPF soot load;
   selecting the fourth mode responsive to each of the engine idling condition and the higher than threshold SCR catalyst NOx load;
   selecting the fifth mode responsive to each of a mid-load engine condition and the higher than threshold DPF soot load;

selecting the sixth mode responsive to each of the mid-load engine condition and the higher than threshold SCR catalyst NOx load;

selecting the seventh mode responsive to each of a vehicle acceleration event and the higher than threshold DPF soot load;

selecting the eighth mode responsive to each of the vehicle acceleration event and the higher than threshold SCR catalyst NOx load;

selecting the ninth mode responsive to each of a high engine load condition and the higher than threshold DPF soot load; and selecting the tenth mode responsive to each of the high engine load condition and the higher than threshold SCR catalyst NOx load.

19. The system of claim 18, further comprising transitioning from the first mode to the second mode based on each of the higher than threshold NOx loading at the SCR catalyst and a lower than threshold soot loading at the DPF; transitioning from the second mode to the third mode based on each of a higher than threshold engine temperature, a higher than threshold soot loading at the DPF, a lower than threshold NOx loading at the SCR catalyst, and engine idling conditions; transitioning from the third mode to the fourth mode based on each of the higher than threshold NOx loading at the SCR catalyst and the lower than threshold soot loading at the DPF; transitioning from the fourth mode to the fifth mode based on each of the higher than threshold soot loading at the DPF, the lower than threshold NOx loading at the SCR catalyst, and mid-load engine conditions; transitioning from the fifth mode to the sixth mode based on each of the higher than threshold NOx loading at the SCR catalyst and the lower than threshold soot loading at the DPF; transitioning from the sixth mode to the seventh mode based on each of the higher than threshold soot loading at the DPF, the lower than threshold NOx loading at the SCR catalyst, and vehicle accelerating conditions; transitioning from the seventh mode to the eighth mode based on each of the higher than threshold NOx loading at the SCR catalyst and the lower than threshold soot loading at the DPF; transitioning from the eighth mode to the ninth mode based on each of a higher threshold engine load, the higher than threshold soot loading at the DPF, and the lower than threshold NOx loading at the SCR catalyst; and transitioning from the ninth mode to the tenth mode based on each of the higher than threshold NOx loading at the SCR catalyst and the lower than threshold soot loading at the DPF.

* * * * *